(12) United States Patent
Sugiyama et al.

(10) Patent No.: US 10,230,100 B2
(45) Date of Patent: Mar. 12, 2019

(54) NEGATIVE-ELECTRODE ACTIVE MATERIAL, PRODUCTION PROCESS FOR THE SAME AND ELECTRIC STORAGE APPARATUS

(71) Applicant: KABUSHIKI KAISHA TOYOTA JIDOSHOKKI, Kariya-shi, Aichi (JP)

(72) Inventors: Yusuke Sugiyama, Kariya (JP); Masataka Nakanishi, Kariya (JP); Nobuhiro Goda, Kariya (JP); Tomohiro Niimi, Kariya (JP); Masakazu Murase, Kariya (JP); Takeshi Kondo, Kariya (JP); Shigenori Koishi, Kariya (JP); Hiroshi Hirate, Kariya (JP); Yoshihiro Nakagaki, Kariya (JP); Mutsumi Takahashi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 645 days.

(21) Appl. No.: 14/761,999

(22) PCT Filed: Dec. 25, 2013

(86) PCT No.: PCT/JP2013/007593
§ 371 (c)(1),
(2) Date: Jul. 20, 2015

(87) PCT Pub. No.: WO2014/128814
PCT Pub. Date: Aug. 28, 2014

(65) Prior Publication Data
US 2015/0349337 A1    Dec. 3, 2015

(30) Foreign Application Priority Data

Feb. 22, 2013   (JP) .................................. 2013-033302

(51) Int. Cl.
| | |
|---|---|
| H01M 4/36 | (2006.01) |
| H01M 4/62 | (2006.01) |
| H01M 4/60 | (2006.01) |
| H01M 4/134 | (2010.01) |
| H01M 4/38 | (2006.01) |
| C01B 33/18 | (2006.01) |
| H01M 10/0525 | (2010.01) |

(52) U.S. Cl.
CPC ............. *H01M 4/366* (2013.01); *C01B 33/18* (2013.01); *H01M 4/134* (2013.01); *H01M 4/386* (2013.01);
(Continued)

(58) Field of Classification Search
None
See application file for complete search history.

(56) References Cited

U.S. PATENT DOCUMENTS

2002/0164479 A1* 11/2002 Matsubara ............ H01M 4/362
                                                            428/367
2014/0127557 A1    5/2014 Kasahara et al.
2014/0234722 A1*  8/2014 Kyotani ................. B82Y 30/00
                                                            429/231.8

FOREIGN PATENT DOCUMENTS

| CN | 101894939 A | 11/2010 |
|---|---|---|
| JP | 3865033 B2 | 10/2006 |

(Continued)

OTHER PUBLICATIONS

Kumai et al. "Si—C composite anode of layered polysilane (Si6H6) and sucrose for lithium ion rechargeable batteries." J. Mater. Chem., 2011,21, 11941-11946.*

(Continued)

*Primary Examiner* — Alix E Eggerding
(74) *Attorney, Agent, or Firm* — Sughrue Mion, PLLC

(57) ABSTRACT

A negative-electrode active material is used for a negative electrode, the negative-electrode active material including:

(Continued)

agglomerated particles including nanometer-size silicon produced by heat treating a lamellar polysilane having a structure in which multiple six-membered rings constituted of a silicon atom are disposed one after another, and expressed by a compositional formula, $(SiH)_n$; and a carbon layer including amorphous carbon, and covering at least some of the agglomerated particles to be composited therewith. An electric storage apparatus including the same is not only able to reduce the irreversible capacity, but also able to inhibit the generation of "SEI."

4 Claims, 13 Drawing Sheets

(52) U.S. Cl.
CPC .......... *H01M 4/604* (2013.01); *H01M 4/622* (2013.01); *H01M 4/625* (2013.01); *H01M 10/0525* (2013.01); *H01M 2220/30* (2013.01)

(56) References Cited

FOREIGN PATENT DOCUMENTS

| | | |
|---|---|---|
| JP | 2009-102219 A | 5/2009 |
| JP | 2011-037947 A | 2/2011 |
| JP | 2011-090806 | * 5/2011 |
| JP | 2011-090806 A | 5/2011 |
| JP | 2011-210649 A | 10/2011 |
| JP | 2012-022924 A | 2/2012 |
| JP | 2012-059509 A | 3/2012 |
| JP | 2012-212561 A | 11/2012 |
| JP | 2012-221885 A | 11/2012 |
| JP | 2013-037809 A | 2/2013 |
| WO | 2011/157013 A1 | 12/2011 |
| WO | 2012/169282 A1 | 12/2012 |
| WO | 2013/001739 A1 | 1/2013 |

OTHER PUBLICATIONS

Communication dated Mar. 17, 2016 from the Japanese Patent Office in counterpart application No. 2015-501099.

H.D. Fuchs et al., "Porous silicon and siloxene: Vibrational and Structural properties", Physical Review B 1993, pp. 8172-8189, vol. 48, No. 11.

International Search Report for PCT/JP2013/007593 dated Apr. 22, 2014.

Written Opinion for PCT/JP2013/007593 dated Apr. 22, 2014.

International Preliminary Report on Patentability (IPRP) for PCT/JP2013/007593 dated Feb. 26, 2015.

* cited by examiner

NEGATIVE-ELECTRODE ACTIVE MATERIAL, PRODUCTION PROCESS FOR THE SAME AND ELECTRIC STORAGE APPARATUS

CROSS REFERENCE TO RELATED APPLICATIONS

This application is a National Stage of International Application No. PCT/JP2013/007593 filed Dec. 25, 2013, claiming priority based on Japan Patent Application No. 2013-033302, filed Feb. 22, 2013, the contents of all of which are incorporated herein by reference in their entirety.

TECHNICAL FIELD

The present invention relates to a negative-electrode active material used for electric storage apparatuses such as lithium-ion secondary batteries, a production process for the same, and to an electric storage apparatus such as secondary batteries, electric double-layer capacitors and lithium-ion capacitors using the negative-electrode active material, respectively.

BACKGROUND ART

Lithium-ion secondary batteries have high charged and discharged capacities, and are secondary batteries being able to make the outputs high. Currently, the lithium-ion secondary batteries have been used mainly as power sources for portable electronic appliances, and have further been expected as power sources for electric automobiles anticipated to become widespread from now on. The lithium-ion secondary batteries comprise active materials being capable of inserting and eliminating (or sorbing and desorbing) lithium (Li) in the positive electrode and negative electrode, respectively. And, lithium ions moving within an electrolytic solution disposed between the two electrodes lead to operating the lithium-ion secondary batteries.

In the lithium-ion secondary batteries, a lithium-containing metallic composite oxide, such as lithium/cobalt composite oxides, has been used mainly as an active material of the positive electrode; whereas a carbon material having a multilayered structure has been used mainly as an active material of the negative electrode. The performance of the lithium-ion secondary batteries is dependent on materials of the positive electrode, negative electrode and electrolyte constituting the secondary batteries. Even among the materials, researches and developments of active-material ingredients forming the active materials have been carried out actively. For example, silicon or silicon oxides having a higher capacity than the capacity of carbon have been investigated as a negative-electrode active-material ingredient.

Using silicon as a negative-electrode active material enables a battery to have a higher capacity than using a carbon material. However, silicon exhibits a large volumetric changes accompanied by occluding and releasing (or sorbing and desorbing) lithium (Li) at the time of charging and discharging operations. Consequently, silicon has been pulverized finely to cause structural changes during charging and discharging operations so that silicon has peeled off or came off from a current collector, and thereby such a problematic issue arises probably that the charging/discharging cycle longevity of a battery is short. Hence, using a silicon oxide as a negative-electrode active material enables the volumetric changes accompanied by sorbing and desorbing lithium (Li) at the time of charging and discharging operations to be inhibited more than using silicon.

For example, employing as a negative-electrode active material silicon oxide (e.g., $SiO_x$ where "x" is $0.5 \leq$ "x" $\leq 1.5$ approximately) has been investigated. The $SiO_x$ has been known to decompose into Si and $SiO_2$ when being heat treated. The decomposition is referred to as a "disproportionation reaction," the $SiO_x$ separates into two phases, an Si phase and an $SiO_2$ phase, by the internal reactions of solid. The Si phase separated to be obtainable is very fine. Moreover, the $SiO_2$ phase covering the Si phase possesses an action of inhibiting electrolytic solutions from being decomposed. Therefore, a secondary battery, which uses a negative-electrode active material composed of the $SiO_x$ having been decomposed into Si and $SiO_2$, excels in the cyclability.

The finer silicon particles constituting the Si phase of the above-mentioned $SiO_x$ are, the more a secondary battery using the particles as a negative-electrode active material is upgraded in the cyclability. Hence, Japanese Patent No. 3865033 (i.e., Patent Application Publication No. 1) sets forth a process for producing $SiO_x$ by heating metallic silicon and $SiO_2$ to sublime in order to turn the metallic silicon and $SiO_2$ into a silicon oxide gas, and then cooling the silicon oxide gas. The process enables the particle diameters of the silicon particles constituting the Si phase to exhibit such a nanometer size as from 1 nm to 5 nm.

Moreover, Japanese Unexamined Patent Publication (KOKAI) Gazette No. 2009-102219 (i.e., Patent Application Publication No. 2) sets forth a production process in which a silicon raw material is decomposed down to the elemental states in a high-temperature plasma, the decomposed silicon raw material is cooled quickly down to a liquid nitrogen temperature to obtain nanometer-size silicon particles, and the nanometer-size silicon particles are fixated into an $SiO_2$—$TiO_2$ matrix by a sol-gel method, and the like.

However, according to the production process set forth in Patent Application Publication No. 1, the matrix is limited to subliming materials. Moreover, according to the production process set forth in Patent Application Publication No. 2, a high energy has come to be needed for plasma discharge. In addition, the silicon composites obtained by the production processes have such a drawback that the dispersibility of Si-phase silicon particles is so low that the particles are likely to agglomerate. When the Si particles agglomerate one another so that the particle diameters become large, a secondary battery using the agglomerated Si particles has a low initial capacity, and the cyclability also declines. Moreover, in the case of the techniques set forth in Patent Application Publication Nos. 1 and 2, since an oxide layer is needed to fixate nanometer-size silicon upon producing the silicon particles, the techniques cause an irreversible reaction to occur between the oxide layer and Li, and associate with a drawback of bringing about capacity declines as a cell.

Incidentally, nanometer-size silicon materials, which have been expected to be utilized in fields such as semiconductors, electric and electronic engineering, have been developed in recent years. For example, Physical Review B (1993), vol. 48, pp. 8,172-8,189 (i.e., Non-patent Literature No. 1) sets forth a process in which a lamellar polysilane is synthesized by reacting hydrogen chloride (HCl) and calcium disilicide ($CaSi_2$) one another. The article further sets forth that the thus obtained lamellar polysilane is utilizable for light-emitting devices, and the like.

And, Japanese Unexamined Patent Publication (KOKAI) Gazette No. 2011-090806 (i.e., Patent Application Publication No. 3) sets forth a lithium-ion secondary battery using a lamellar polysilane as a negative-electrode active material.

PATENT LITERATURE

Patent Application Publication No. 1: Japanese Patent Gazette No. 3865033;
Patent Application Publication No. 2: Japanese Unexamined Patent Publication (KOKAI) Gazette No. 2009-102219; and
Patent Application Publication No. 3: Japanese Unexamined Patent Publication (KOKAI) Gazette No. 2011-090806

NON-PATENT LITERATURE

Non-patent Literature No. 1: Physical Review B (1993), vol. 48, pp. 8,172-8,189

SUMMARY OF THE INVENTION

Technical Problem

However, since the negative-electrode active material composed of the lamellar polysilane set forth in Patent Application Publication No. 3 had a large BET specific surface area, the negative-electrode active material had such a drawback as being not preferable as a negative-electrode active-material ingredient for secondary battery. For example, in the negative electrode of a lithium-ion secondary battery, since a large BET specific surface area facilitates decompositions of the electrolytic solution, the irreversible capacity consumed at the negative electrode becomes so great that making the capacity high is difficult. Moreover, since "SEI" is likely to occur, the negative-electrode active material has such a problem that the cyclability is low.

The present invention is made in view of such circumstances. An Object of the present invention is to provide a negative-electrode active material not only enabling the irreversible capacity to be reduced but also enabling "SEI" to be inhibited from generating, and to provide an electric storage apparatus using the negative-electrode active material for one of the negative electrodes.

Solution to Problem

Features of a negative-electrode active material according to the present invention solving the aforementioned technical problems lie in that the present negative-electrode active material comprises a composite including:

agglomerated particles comprising nanometer-size silicon produced by heat treating a lamellar polysilane having a structure in which multiple six-membered rings constituted of a silicon atom are disposed one after another, and expressed by a compositional formula, $(SiH)_n$; and a carbon layer comprising amorphous carbon, and covering at least some of the agglomerated particles to be composited therewith.

And, a feature of an electric storage apparatus according to the present invention lies in that the electric storage apparatus comprises a negative electrode including the present negative-electrode active material.

Advantageous Effects of the Invention

A negative-electrode active material according to the present invention comprises a composite including: agglomerated particles comprising nanometer-size silicon; and a carbon layer comprising amorphous carbon, which is less likely to react with Li irreversibly, and covering at least some of the agglomerated particles. Consequently, not only reducing the irreversible capacity is made possible, but also the agglomerated particles are inhibited from being finely pulverized when the present negative-electrode active material expands and contracts repetitively, as a constituent element of an electric storage apparatus, at the time of charging and discharging operations. Therefore, the discharged capacities and cyclability upgrade, because inhibiting the specific surface area from augmenting is made possible in a negative electrode, and because "SEI" is also inhibited from generating.

DESCRIPTION OF THE EMBODIMENTS

Production Process for Nanometer-Size Silicon Agglomerated Particles

Figure 1:
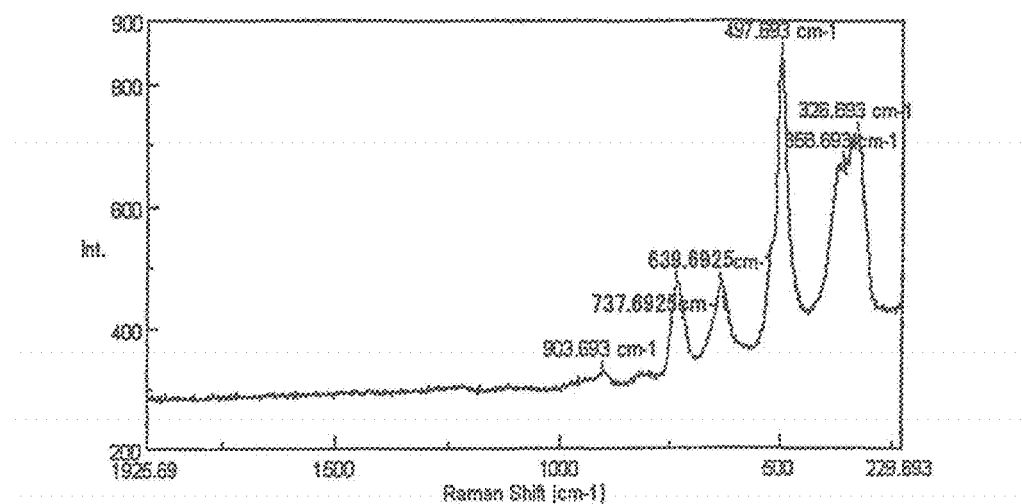
FIG. 1 shows is a Raman spectrum of a lamellar polysilane.
Figure 2:
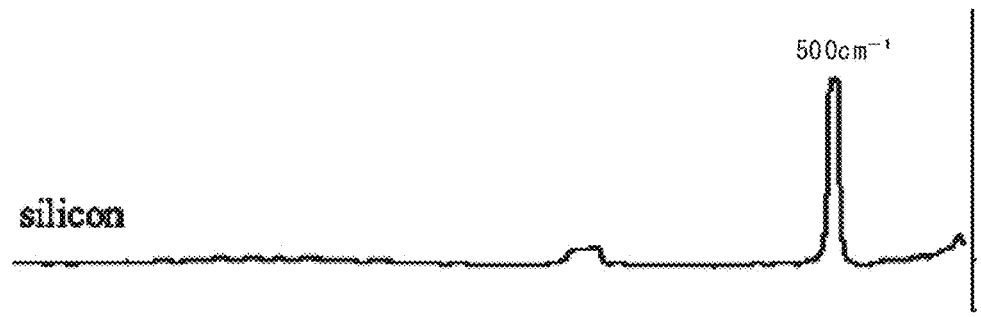
FIG. 2 is a Raman spectrum of a single-crystal silicon.

The inventors named in the present application carried out wholehearted studies regarding the lamellar polysilanes set forth in Non-patent Literature No. 1 and Patent Application Publication No. 3, and paid attention to the Raman spectra therein. In general, a Raman shift has been known that bonds become strong when the Raman shift shifts toward the high-frequency side, and that bonds are likely to be cut off when the Raman shift shifts toward the low-frequency side. FIG. 1 shows a Raman spectrum of the lamellar polysilanes; whereas FIG. 2 shows a Raman spectrum of single-crystal silicon. From the comparison between FIG. 1 and FIG. 2, when noticing a peak of the Si—Si bond observed at 500 cm$^{-1}$ in the single-crystal silicon, the peak was found out to shift to the low-frequency side at around 320 cm$^{-1}$ in the lamellar polysilanes, compared with the single-crystal silicon.

That is, since having a lamellar-polysilane structure led to weakening the Si—Si bond, such a prediction was made that making nanometer-size silicon under a mild condition becomes feasible. And, heat treating a lamellar polysilane at a temperature beyond 100° C. under a nonoxidizing atmosphere was discovered to result in making a nanometer-size silicon material obtainable. The lamellar polysilane set forth in Non-patent Literature No. 1 has a structure in which multiple six-membered rings constituted of a silicon atom are disposed on after another, and adopts a lamellar polysilane expressed by a compositional formula, (SiH)$_n$, as the basic skeleton. Heat treating the lamellar polysilane at a temperature beyond 100° C. under a nonoxidizing atmosphere resulted in obtaining a nanometer-size silicon material of which the crystallite size was 5 nm approximately. When being heat treated at less than 100° C., the structure of the lamellar polysilane was maintained without any change, so that nanometer-size silicon was not obtained. Although a time for the heat treatment depended on the heat-treatment temperature, one hour sufficed therefor when doing the heat treatment at 500° C. or more.

Moreover, although being Si does not lead to any problem, the SiO$_2$ component included in a great amount within a negative-electrode active material has been known to cause degradations to occur in the initial characteristics. However, the lamellar polysilanes set forth in Non-patent Literature No. 1 and Patent Application Publication No. 3 are not suited for a negative-electrode active material as described above, because the amounts of included oxygen are great, even though the BET specific surface areas are as small as 20 m$^2$/g approximately.

Hence, as the result of wholehearted studies, the following became apparent: depending on the production conditions of lamellar polysilane, the BET specific surface area and oxygen amount of an obtainable lamellar polysilane change; and the BET specific surface area and oxygen amount of nanometer-size silicon obtainable by heat treating the lamellar polysilane also change. In Non-patent Literature No. 1 and Patent Application Publication No. 3, hydrogen chloride (HCl) and calcium disilicide (CaSi$_2$) are reacted one another to obtain a lamellar polysilane. The calcium disilicide (CaSi$_2$) forms a lamellar crystal in which anatomic Ca layer is inserted between the (111) planes of diamond-type Si, and in which calcium (Ca) is pulled off by a reaction between the calcium disilicide and an acid so that a lamellar polysilane is obtainable.

The thus obtained lamellar polysilane exhibits Raman-shift peaks existing at 341±10 cm$^{-1}$, 360±10 cm$^{-1}$, 498±10 cm$^{-1}$, 638±10 cm$^{-1}$, and 734±10 cm$^{-1}$ in a Raman spectrum.

Using a mixture of hydrogen fluoride (HF) and hydrogen chloride (HCl) as an acid for pulling off Ca made the following apparent: even though the BET specific surface areas of an obtainable lamellar polysilane and nanometer-size silicon material augment, the oxygen amounts become less. However, the BET specific surface area having been augmented is not preferable. Moreover, an obtainable nanometer-size silicon material agglomerates to make agglomerated particles. Consequently, when the nanometer-size silicon material serves as a constituent element of an electric storage apparatus, finely-pulverized agglomerated particles occur by undergoing expansions and contractions repetitively at the time of charging and discharging operations, and thereby such a problems arises that the cyclability is declined not only by the augmented specific surface area, but also by the generation of "SEI."

Hence, a negative-electrode active material according to the present invention comprises agglomerated particles including nanometer-size silicon, and a carbon layer including amorphous carbon and covering at least some of the agglomerated particles to be composited therewith. Although using products obtained by heating treating the lamellar polysilanes set forth in Non-patent Literature No. 1 and Patent Application Publication No. 3 for the agglomerated particles including nanometer-size silicon is also allowed, using a product obtained by heat treating a lamellar polysilanes produced by the following production process therefor is desirable.

That is, a mixture of hydrogen fluoride (HF) and hydrogen chloride (HCl) is reacted with calcium disilicide (CaSi$_2$).

In the production process, a mixture of hydrogen fluoride (HF) and hydrogen chloride (HCl) is used as an acid. Using hydrogen fluoride (HF) leads to etching the SiO$_2$ component generating during the synthesis or during the purification, and accordingly the oxygen amount is reduced, even though the BET specific surface area is large. Even when using hydrogen fluoride (HF) alone, even though a lamellar polysilane is obtainable, using hydrogen fluoride (HF) alone is not preferable because the lamellar polysilane is highly active so as to be oxidized by a trace amount of air to conversely augment the oxygen amount. Moreover, when using hydrogen chloride (HCl) alone, since the setting is identical with the production process according to Non-patent Literature No. 1, only a lamellar polysilane with a great oxygen amount is obtainable, even though a lamellar polysilane with a similar structure is obtainable.

A desirable compositional ratio between the hydrogen fluoride (HF) and the hydrogen chloride (HCl) falls in such a range as HF/HCl=from 1/1 to 1/100 by mol. An amount of the hydrogen fluoride (HF) being more than the ratio is not preferable, because impurities, such as CaF$_2$ and CaSiO-based impurities, generate and because separating the impurities from a lamellar polysilane is difficult. Moreover, when an amount of the hydrogen fluoride (HF) becomes less than the ratio, such a case arises probably as the effect of etching resulting from HF weakens and oxygen remains abundantly in a lamellar polysilane.

A desirable blending ratio between the mixture of hydrogen fluoride (HF) and hydrogen chloride (HC) and the calcium disilicide (CaSi$_2$) is to set the acids more excessive than the equivalent to the latter. Moreover, a desirable reaction is carried out under such a reaction atmosphere as under a vacuum or under an inert-gas atmosphere. Note that the production process was also revealed to make the reaction time short compared with the production process according to Non-patent Literature No. 1. Since Si and HF further react one another so that SiF$_4$ has occurred when the reaction time is too long, a sufficient reaction time is from 0.25 to 24 hours approximately. Even when the reaction temperature is set at room temperature, the mixture, and the calcium disilicide (CaSi$_2$) react one another with ease.

Although the reaction results in generating CaCl$_2$, and the like, the purification of a lamellar polysilane is easy because the by-products are easily removable by washing with water.

Heat treating the thus produced lamellar polysilane at a temperature of 100° C. or more under a nonoxidizing atmosphere leads to making the nanometer-size silicon agglomerated particles of which not only the BET specific surface area is decreased but also the oxygen amount is less. As for the nonoxidizing atmosphere, an inert-gas atmosphere, or a vacuum atmosphere is exemplified. The inert gas is not at all prescribed especially as far as the inert gas comprises nitrogen, argon or helium, and the like, but does not include any oxygen.

Moreover, a preferable heat-treatment temperature falls in a range of from 100° C. to 1,000° C., and an especially preferable heat-treatment temperature falls in a range of from 400° C. to 600° C. No nanometer-size silicon generates at less than 100° C. In particular, a lithium-ion secondary battery comprising the nanometer-size silicon agglomerated particles, which are formed by heat treating the lamellar polysilane at 400° C. or more to serve as a negative-electrode active material, has an upgraded initial efficiency.

A preferable Si-crystallite size of the nanometer-size silicon in the agglomerated particles falls in a range of from 0.5 nm to 300 nm when using the agglomerated particles as an electrode active material of the present electric storage apparatus. The Si-crystallite size falls desirably in a range of from 1 nm to 100 nm, more desirably in a range of from 1 nm to 50 nm, and much more desirably in a range of from 1 nm to 10 nm. Note that the crystallite size is computed by the Scherrer equation from a half-value width of a diffraction peak in the (111) plane according to the result of an X-ray diffraction measurement.

Although the nanometer-size silicon obtained by heat treating a lamellar polysilane produced by the production process set forth in Non-patent Literature No. 1 has such a large oxygen amount as about 33%, the nanometer-size silicon obtained by heat treating another lamellar polysilane produced by the above-mentioned production process has such a small oxygen amount as 30% or less.

Structure of Nanometer-Size Silicon

Figure 4:
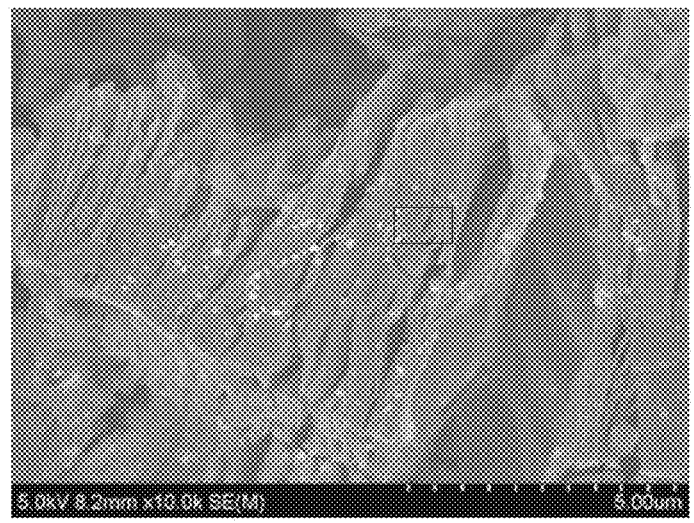
FIG. 4 shows an SEM photographic image of nanometer-size silicon agglomerated particles directed to the first example.
Figure 5:
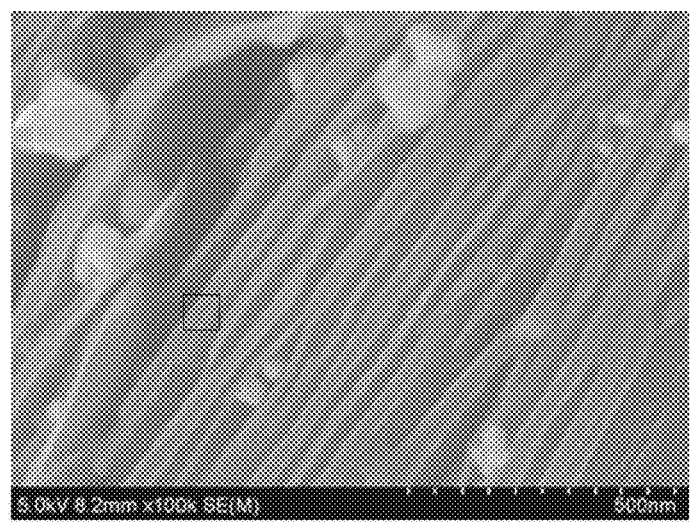
FIG. 5 shows an enlarged SEM photographic image of the nanometer-size silicon agglomerated particles directed to the first example.

The agglomerated particles comprising nanometer-size silicon and used in the present invention has a structure made by laminating a plate-shaped silicon body in a quantity of multiple pieces one after another in the thickness direction. As shown in FIGS. 4 and 5, the structure is ascertainable by an SEM observation. Note that FIG. 5 shows a diagram in which the rectangled part shown in FIG. 4 is enlarged. Although the plate-shaped silicon bodies are observed to have a thickness of from about 10 nm to about 100 nm, a preferable thickness of the plate-shaped silicon bodies falls in a range of from 20 nm to 50 nm, from such viewpoints as the strength and the easiness of inserting lithium ions and so on thereinto and separating the ions therefrom. Moreover, the plate-shaped silicon bodies had actually a long-axis-direction length of from 0.1 μm to 50 μm, respectively. Note that preferable plate-shaped silicon bodies are believed to exhibit such an aspect ratio (i.e., "the long-axis-direction length"/"thickness") as from 2 to 1,000, respectively.

Figure 6:
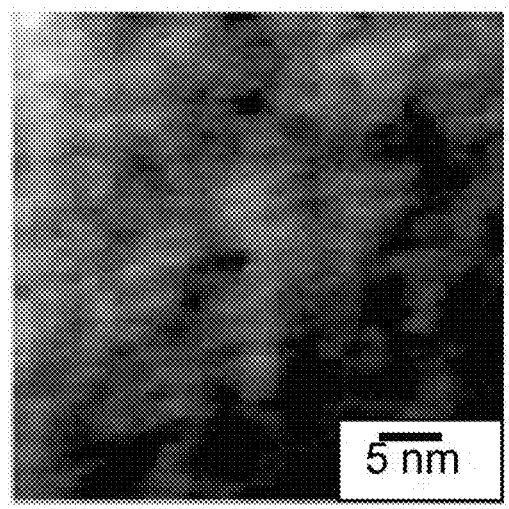
FIG. 6 shows a TEM/EELS photographic image of the nanometer-size silicon agglomerated particles directed to the first example.
Figure 7:
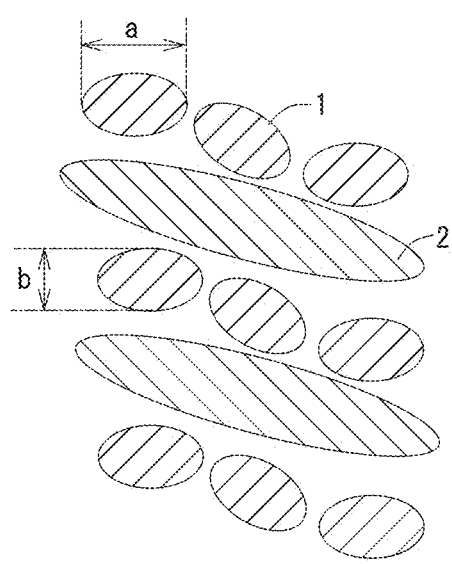
FIG. 7 is a schematic cross-sectional diagram illustrating a major part of a plate-shaped silicon body directed to the first example enlargedly.

In accordance with TEM (i.e., transmission electron microscopy)/EELS (i.e., electron energy loss spectroscopy), a shaded stripe-shaped structure is noticeable in the plate-shaped silicon bodies, as shown in FIG. 6. Note that FIG. 6 shows a diagram in which the squared part shown in FIG. 5 is enlarged, and that FIG. 7 shows a schematic cross-sectional diagram illustrating a major part of the plate-shaped silicon bodies enlargedly. The light gray-colored parts shown in FIG. 6 are believed to have a structure in which flat-shaped nanometer-size silicon particles "1" are oriented perpendicularly with respect to the long sides to arrange lamellarly; whereas the dark gray-colored parts existing between layers of the respective flat-shaped nanometer-size silicon particles "1" are believed to be voids and/or silicon oxides "2." The flat-shaped nanometer-size silicon particles "1" have a long-axis-direction length "a" of from 5 nm to 20 nm, have a short-axis-direction length "b" of from 2 to 5 nm, and have a ratio "a/b," namely, a ratio between the long axis and the short axis, which falls in a range of from 2.5 to 10. Moreover, a thickness of the voids and/or silicon oxides "2" is from 2 nm to 10 nm, and accordingly a ratio of the thickness of the voids and/or silicon oxides "2" with respect to the thickness of the flat-shaped nanometer-size silicon particles "1" comes to fall in a range of from 0.5 to 2.

Composite

The present negative-electrode active material includes a composite made by covering at least some of the agglomerated particles comprising nanometer-size silicon with a carbon layer comprising amorphous carbon. Hereinafter, the composite is explained. Note that the carbon constituting the carbon layer is also allowed to be amorphous carbon alone, or is even permitted to be amorphous carbon and crystalline carbon intermingling with each other.

The carbon layer comprising amorphous carbon covers at least some of the agglomerated particles. The carbon layer expresses clearly an advantageous effect of reinforcing the agglomerated particles. Note that, although there are instances where conductive additives, such as graphite, acetylene black and KETJENBLACK (registered trademark), are used, the carbon in the conductive additives is crystalline but are not amorphous.

A preferable thickness of the carbon layer covering the nanometer-size silicon agglomerated particles to be composited therewith falls in a range of from 1 to 100 nm, and a more desirable thickness thereof falls in a range of from 5 to 50 nm. When the thickness of the carbon layer is too thin, expressing the advantageous effect clearly becomes difficult; whereas, when the carbon layer becomes too thick, the resistance of a battery rises, so that there probably arises such cases as charging and discharging operations become difficult. Moreover, the carbon layer is also preferred to have a structure in which the nanometer-size silicon agglomerated particles are dispersed in a matrix of the carbon layer.

Regarding the composition between silicon and carbon in the composite, the carbon preferably accounts for an amount falling in a range of from 1 to 40% by mass, and especially desirably accounts for an amount falling in a range of from 3 to 7% by mass. The carbon amount being greater than 40% by mass is not practical, because an initial capacity becomes low when being used for one of the negative electrodes of an electric storage apparatus. Moreover, the advantageous effect resulting from compositing the carbon layer is not obtainable when the carbon amount is less than 1% by mass.

Figure 17:
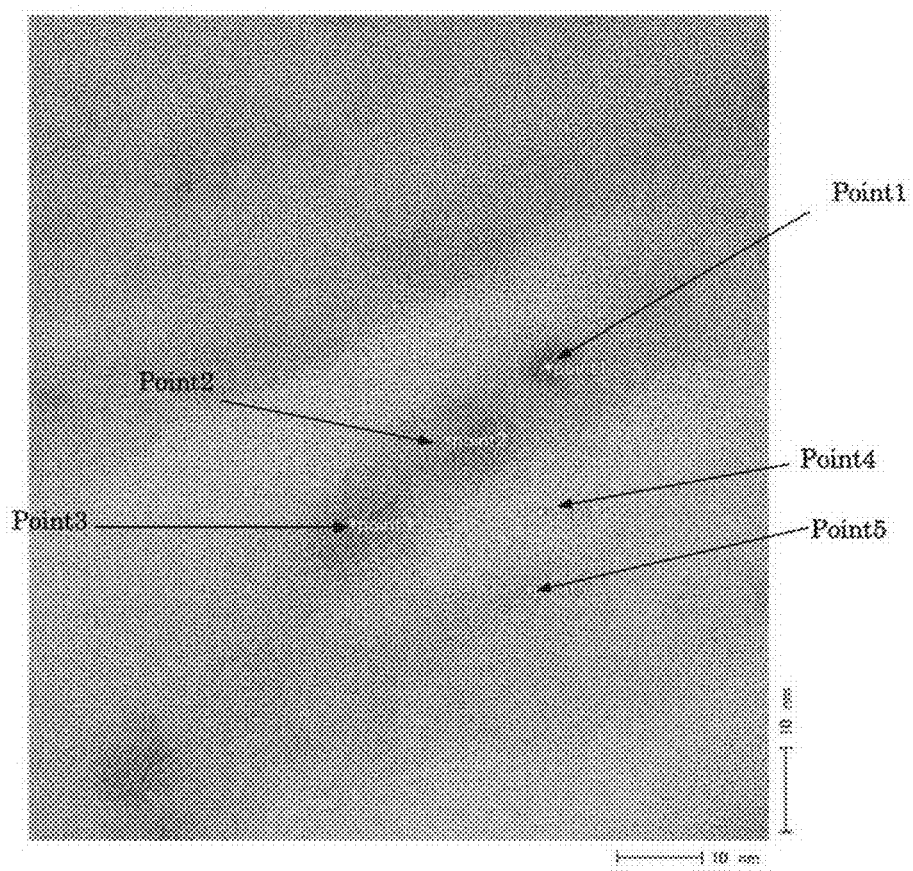
FIG. 17 shows a TEM photographic image of a composite directed to a fifth example.
Figure 18:
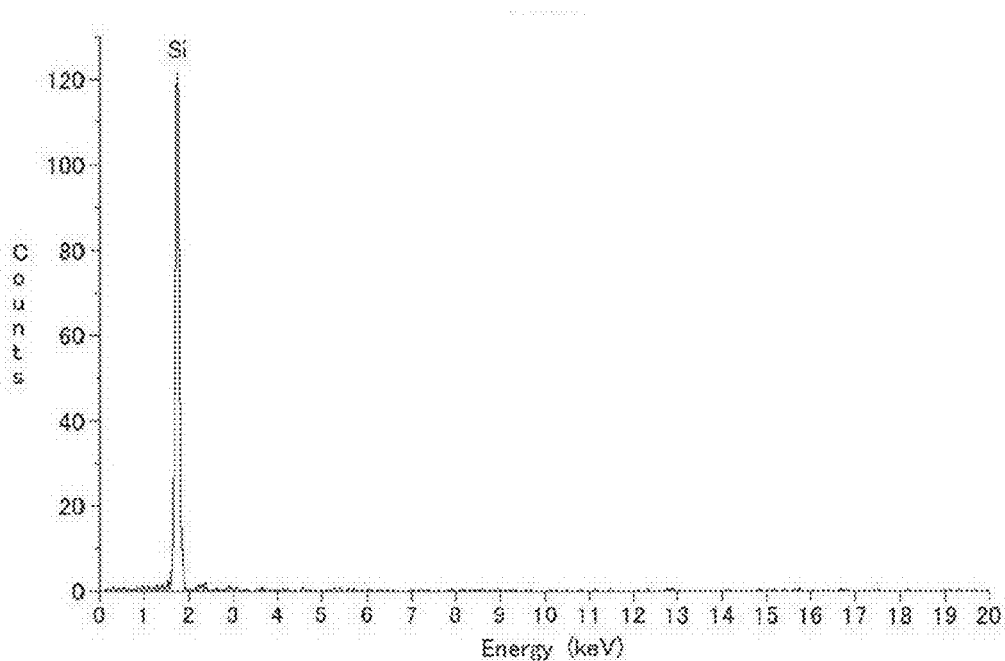
FIG. 18 is a TEM/EDX spectrum of a part labeled "Point 1" in FIG. 17.
Figure 19:
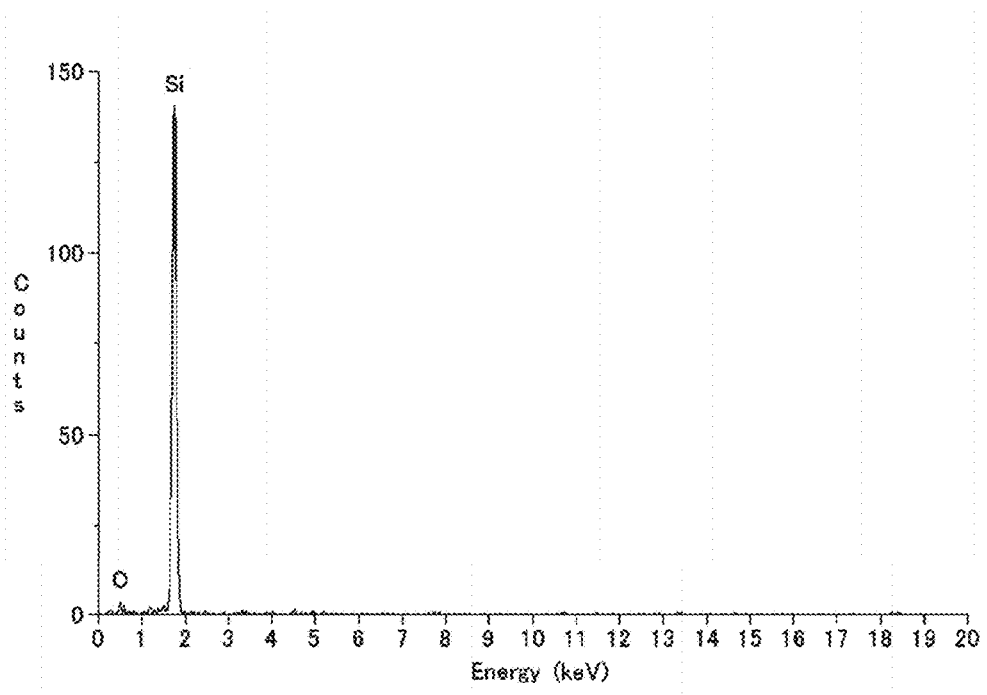
FIG. 19 is a TEM/EDX spectrum of a part labeled "Point 2" in FIG. 17.
Figure 20:
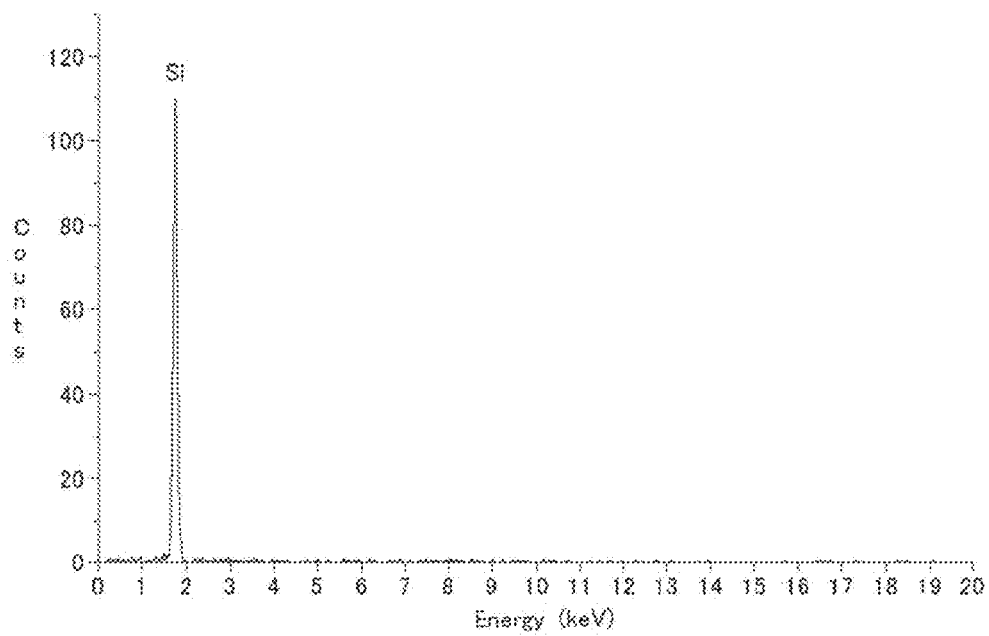
FIG. 20 is a TEM/EDX spectrum of a part labeled "Point 3" in FIG. 17.
Figure 21:
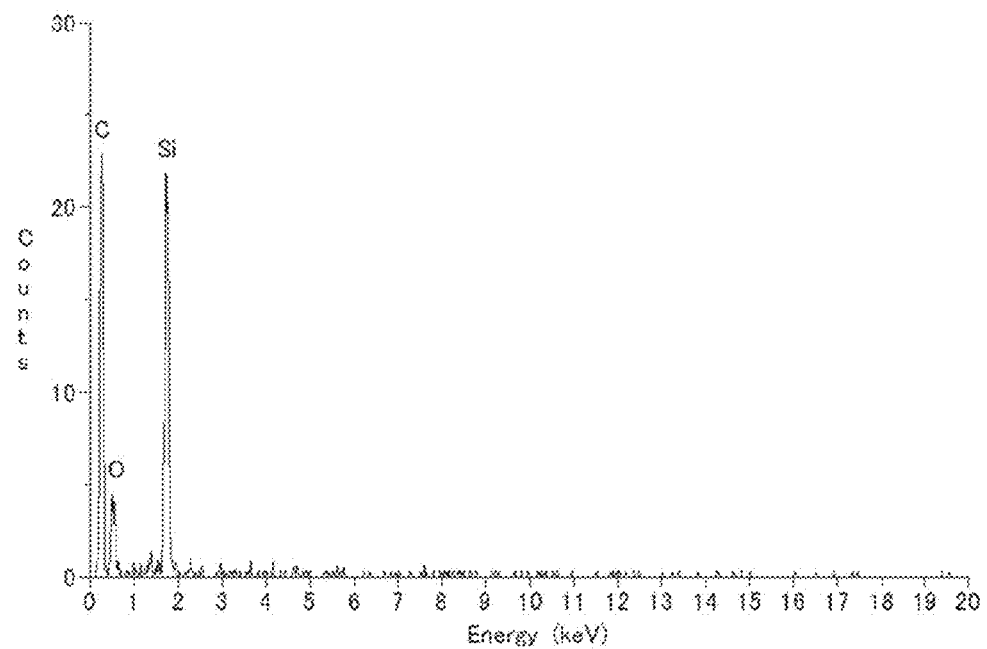
FIG. 21 is a TEM/EDX spectrum of a part labeled "Point 4" in FIG. 17.
Figure 22:
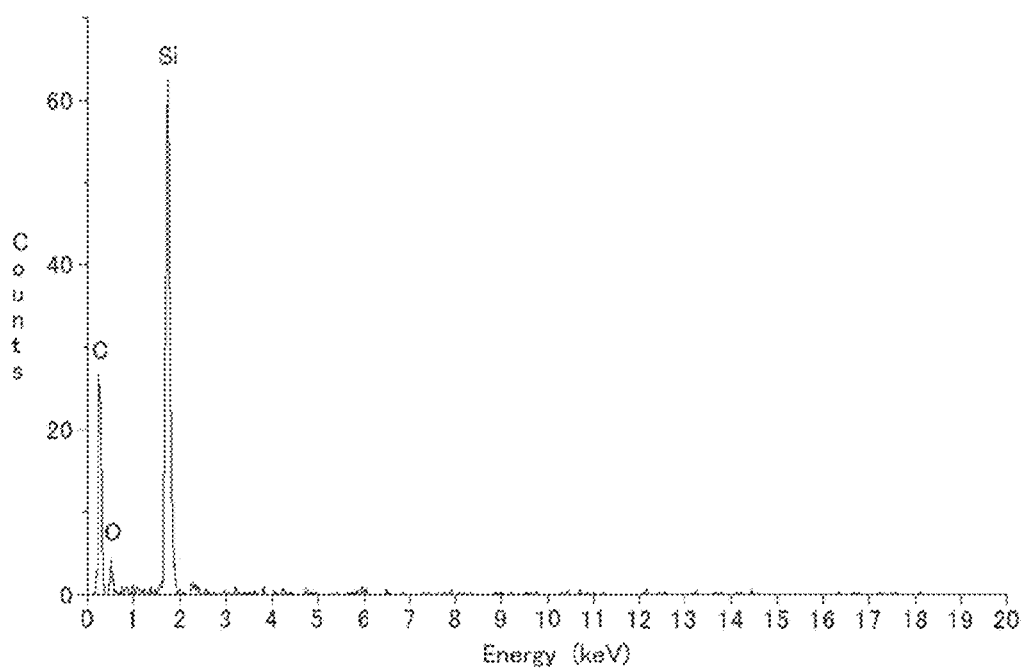
FIG. 22 is a TEM/EDX spectrum of a part labeled "Point 5" in FIG. 17.

FIG. 17 shows a TEM photographic image obtained by carrying out a TEM (i.e., transmission electron microscopy) measurement to the composite. The composite is found out to make a structure in which the following are laminated lamellarly: light gray-colored parts; and parts in which dark gray-colored particles (of which the major-axis particle diameter is about 10 nm) are oriented perpendicularly with respect to the long sides to arrange lamellarly.

Hence, a TEM/EDX analysis was carried out to the respective points labeled "Points 1 through 5" in FIG. 17 in order to ascertain compositions thereat. FIGS. 18 through 22 show the results, respectively. "Points 1 through 3" had compositions in which silicon (Si) accounted for 91.5 atomic % or more, and the dark-colored particles were ascertained to be nanometer-size silicon particles. Moreover, from "Points 4 and 5," a great amount of carbon (C), and a trace amount of oxygen (O) were detected in addition to Si, so that the light gray-colored parts were found out to be carbon layers in which carbon (C) was present abundantly.

Including at least one metallic atom selected from the group consisting of transition metals in the carbon layer is also preferable. Since the metallic atom upgrades an electric-conducting property within the carbon layer, the conducting property of lithium ions, and the like, improves in a negative electrode. Therefore, the sorbing and desorbing characteristics of lithium, and so forth, upgrade at the time of charging and discharging operations, thereby making the resistance against the movements of Li reducible. Accordingly, a secondary battery upgrades in the initial efficiency and initial capacity.

As for the metallic atom selected from the group consisting of transition metals, Cu, Fe or Ni, and the like, is preferable. Cu is preferable especially. Moreover, a preferable content of the metallic atom in the carbon layer falls in a range of from 0.1 to 10% by mass. When the content of the metallic atom is less than 0.1% by mass, clearly expressing the advantageous effect resulting from the addition becomes difficult; whereas, when the content exceeds 10% by mass, strength of the carbon layer declines so that the cyclability of a secondary battery has declined.

Including an electrically-conducting powder in the carbon layer is also preferable. Since the electrically-conducting powder upgrades an electrically-conducting property within the carbon layer, reducing the resistance is enabled against the movements of electrons to and from the agglomerated particles, so that the conducting property of lithium ions, and the like, improves in a negative electrode. Therefore, the sorbing and desorbing characteristics of lithium, and so forth, upgrade at the time of charging and discharging operations, thereby upgrading a secondary battery in the initial efficiency and initial capacity. Moreover, introducing the electrically-conducting powder also upgrades the cyclability of a secondary battery, although detailed reasons therefor have not been clear yet.

As for the electrically-conducting powder, the following are usable: carbon-based electrically-conducting powders, such as acetylene black, KETJENBLACK (registered trademark), carbon fibers, carbon nanometer-size tubes, graphene, or miniaturized graphite particles set forth in WO2011/155486 Publication; or powders of electrically-conducting metals. A preferable content of the electrically-conducting powder in the carbon layer falls in a range of from 1 to 50% by mass. When the content of the electrically-conducting powder is less than 1% by mass, clearly expressing the advantageous effect resulting from the addition becomes difficult; whereas, when the content exceeds 50% by mass, strength of the carbon layer declines so that the cyclability of a secondary battery has declined.

Moreover, between the respective particles of the composite, interposing a fibrous substance, which exhibits a graphite-resembling carbon skeleton and 90% by mass or more of which comprises carbon, is desirable. Since the fibrous substance excels not only in the electrically-conducting property but also in the strength and flexibility, the fibrous substance is likely to follow up the expanding and contracting movements in a secondary-battery negative electrode at the time of charging and discharging operations. Therefore, not only charging and discharging characteristics upgrade, but also a negative-electrode active-material layer is prevented from destructing so that the cyclability upgrades greatly.

Although the fibrous substance is even permitted to be in a solid shape, a preferable fibrous substance has a hollow cylindrical shape, and has an outside diameter of 40 nm or more. Since having a hollow cylindrical shape enables conductive paths to be formed, the current-carrying property of an electrode upgrades furthermore. Since the strength is insufficient when the outside diameter is less than 40 nm, such a fibrous substance is unsuitable for negative-electrode active material. Although the upper limit is not all prescribed especially, such a substance with 500 nm or more is believed to be unproducible by current production processes. Moreover, a content of the fibrous substance is not at all prescribed especially, a preferable content falls in a range of 5% by mass or less within the present negative-electrode active material. When the fibrous substance becomes more than 5% by mass, since the specific surface area augments, and since the generation amount of "SEI" increases accompanied by the augmentation, such a case arises as the initial capacity of a secondary battery becomes small.

Production Process (1) for Composite

In the instance where the carbon layer is formed, simply mixing the nanometer-size silicon agglomerated particles with carbon produced independently to include an amorphous part by a certain method leads not only to making the carbon layer heterogeneous but also to making the carbon difficult to cover at least some of the agglomerated particles. Hence, in accordance with a production process according to the present invention, carbon comprising an amorphous part securely covers some of the agglomerated particles, thereby making a homogenous negative-electrode active material producible.

That is, a production process according to the present invention comprises the following steps carried out in the following order:

an agglomerated-particles forming step of obtaining nanometer-size silicon agglomerated particles by heat treating a lamellar polysilane having a structure in which multiple six-membered rings constituted of a silicon atom are disposed one after another, and expressed by a compositional formula, $(SiH)_n$;

a polymerizing step of polymerizing an aromatic heterocyclic compound in such a state as the agglomerated particles and the aromatic heterocyclic compound are mixed one another; and a carbonizing step of carbonizing a polymer of the aromatic heterocyclic compound.

The agglomerated-particles forming step of forming nanometer-size silicon agglomerated particles is the same as described above.

At the polymerizing step, an aromatic heterocyclic compound is polymerized in such a state as the nanometer-size silicon agglomerated particles and the aromatic heterocyclic compound are mixed one another. Thus, a polymer of the aromatic heterocyclic compound is obtainable in such a state as being adhered onto the nanometer-size silicon agglomerated particles. Note herein that, for the aromatic heterocyclic compound, the following polymerizable compounds are usable: five-membered-ring aromatic heterocyclic compounds, such as furan, pyrrole, thiophene, imidazole, pyrazole, oxazole, isoxazole, thiazole and isothiazole; and polycyclic aromatic heterocyclic compounds, such as indole, benzimidazole, benzofuran and purine.

Although various polymerizing methods are employable to polymerize the above compounds, a method of heating the compounds in the presence of a polymerizing catalyst, such as concentrated hydrochloric acid or iron(III) chloride (or ferric chloride), is simple and easy, when the compounds are pyrrole, and the like. In particular, using iron(III) chloride results in making the compounds polymerizable in a non-aqueous atmosphere to make the oxidation of Si inhibitable, such an advantageous effect is available as augmenting the initial capacity of an electric storage apparatus when the compounds make a constituent element of the electric storage apparatus.

At the carbonizing step, a polymer of the aromatic heterocyclic compound is carbonized in such a state as being mixed with the nanometer-size silicon agglomerated particles. In the step, the polymer is allowably heat treated at a temperature of 100° C. or more under an inert atmosphere in the same manner as upon producing the nanometer-size silicon, and the polymer is preferably heat treated at 400° C. or more. Since the aromatic heterocyclic compound has been turned into the polymer, the carbonization progresses without any evaporation when heating the polymer, and thereby a composite comprising the amorphous-carbon-including carbon layer bonded onto surfaces of the nanometer-size silicon agglomerated particles is obtainable. Note that the aromatic heterocyclic compound has evaporated so that the carbonizing is difficult when the heat treatment is carried out in such a state as the nanometer-size silicon agglomerated particles and the aromatic heterocyclic compound are mixed one another without carrying out any polymerization step.

Production Process (2) for Composite

In the production process mentioned above, however, the steps, such as polymerization and purifications, are needed, and accordingly the productivity is low. Moreover, such a problem has arisen as forming a composite with an evenly-formed carbon layer is also hard. Hence, features of a second production process according to the present invention lie in that the second production process comprises the following steps carried out in the following order:

an agglomerated-particles forming step of obtaining nanometer-size silicon agglomerated particles by heat treating a lamellar polysilane having a structure in which multiple six-membered rings constituted of a silicon atom are disposed one after another, and expressed by a compositional formula, $(SiH)_n$; and a carbonizing step of mixing the agglomerated particles with a resinous solution comprising a resin and a solvent, then removing the solvent, and thereafter carbonizing the resin.

In accordance with the production process, optimally selecting the resin makes the carbon layer including amorphous carbon producible with ease. In particular, using a resin having been polymerized in advance makes abbreviating the polymerization step possible, and enables inhomogenization upon polymerizing to be made less.

The agglomerated-particles forming step of forming nanometer-size silicon agglomerated particles is the same as described above.

The resinous solution and the agglomerated particles are mixed one another, and then the resin is carbonized after removing the solvent. For the resin used as a carbon precursor, using an easily-graphitizable material or a non-graphitizable material is preferable. A resin with a high carbonized degree is more preferable. As for the resin with a high carbonized degree, the following are exemplified: polycarbonate made from bisphenol A serving as the raw material, epoxy resins, or phenolic resins made from phenol serving as the raw material. A phenolic resin with a particularly high carbonized degree is preferable especially. As for the solvent of the resinous solution, an arbitrary solvent capable of dissolving the resin therein is usable. In order to obtain composite particles with less defects, the agglomerated particles are desirably mixed fully uniformly within the resinous solution to disperse therein.

In the carbonizing step, the resin is allowably heat treated at a temperature of 100° C. or more under an inert atmosphere in the same manner as upon producing the nanometer-size silicon, and the resin is preferably heat treated at 400° C. or more. Using a thermosetting resin for the resin makes carbonizing the thermosetting resin possible after heat curing the thermosetting resin. Moreover, the thermosetting resin is also allowed to be heat cured at a low temperature in advance and thereafter be carbonized by heating the thermosetting resin to a high temperature, or is even permitted to be heat cured in the course of a temperature-raising operation in the carbonizing step.

In the Raman spectrum of carbon produced at the carbonizing step, peaks appear at the "G"-band (i.e., at around 1,590 $cm^{-1}$) and at the "D"-band (i.e., at around 1,350 $cm^{-1}$), respectively. The "G" band is derived from graphite, whereas the "D"-band is derived from defects. Therefore, the Raman spectrum means that the higher a G/D ratio (i.e., a ratio between the "G"-band and the "D"-band) is, the higher the crystallinity is.

According to experiments done by the present inventors, the following became apparent: the G/D ratio of generated carbon depends on calcination temperatures in the carbonizing step; and the higher the calcination temperature is, the higher the G/D ratio becomes. Moreover, a low G/D ratio was clarified to make the initial efficiency of an electric storage apparatus decline when such a carbon made a constituent element of the electric storage apparatus. That is, a preferable carbon of the carbon layer in the composite has a G/D ratio of 0.2 or more, a ratio between the "G"-band and the "D"-band, in the Raman spectrum. Using such a composite for a negative-electrode active material reduces the irreversible capacity of an electric storage apparatus so that the initial efficiency upgrades. To make the G/D ratio 0.2 or more, the calcination temperature in the carbonizing step is preferably set at 500° C. or more. However, when the calcination temperature is too high, side reactions generating SiC occur so that the initial efficiency and initial capacity of an electric storage apparatus decline when the composite makes a constituent element of the electric storage apparatus. Accordingly, the calcination temperature is desirably set at less than 1,100° C.

Moreover, when the carbon formed at the carbonizing step is analyzed in detail by a soft X-ray emission spectroscopy (or SXES) using an electron beam or radiation light, the carbon has an X-ray emission spectrum depending on the types of carbon sources. The X-ray emission generates upon the transition of an electron from the occupied outer-shell orbital to a hole occurred in the inner-shell orbital. The energy (hv) of X-ray emissions is dependent on the energy difference between an inner shell and an outer shell. In the case of carbon, the transition of from the L shell in a valence band to the inner-shell K shell results in a peak appearing in the vicinity where hv is from 276 to 282 eV. The peak is generally called as a $CK_\alpha$ spectrum. When the $CK_\alpha$ spectrum of acetylene black is analyzed, a peak top (i.e., the top of a peak "A") is found out to appear at around hv=from 277.5 to 279.5 eV (where "h" is Planck's constant, and "v" is a frequency). The peak "A" is believed to correspond to the $sp^2$ orbital of carbon. And, in carbon formed from phenolic resins, epoxy resins or polycarbonate, and the like, serving as the carbon source, a distinctive peak top (i.e., the top of a peak "B") appears at around hv=from 279.5 to 281.0 eV in addition to the peak "A". A height of the peak (B) differs depending on the difference between the species of resins. Carbon formed from furan does not have either of the peaks (A) and (B), but exhibits another distinctive peak at around hv=from 279 to 279.5 eV. From the facts, the X-ray emission spectra by the SXES are believed to be able to characterize the properties of carbon. Note that "h" is Planck's constant (i.e., $6.62606957\times10^{-34}$ $m^2$ kg/s) and "v" is an X-ray emission frequency (Hz).

Hence, a preferable carbon of the carbon layer in the composite not only exhibits a peaks "A" which appears at around hv=from 277.5 to 279.5 eV (where "h" is Planck's constant, and "v" is a frequency) but also exhibiting a peak "B" which appears at around hv=from 279.5 to 281.0 eV, in a $CK_\alpha$ X-ray emission spectrum resulting from an SXES. And, when a height of the peak "B" to a height of the peak "A" (i.e., (Peak "B")/(Peak "A")) is 0.92 or more, an electric storage apparatus comes so as to excel in the initial efficiency and initial capacity when such a carbon makes a constituent element of the electric storage apparatus, because the carbon is derived from a phenolic resin.

Production Process (3) for Composite

As described above, a metallic atom selected from the group consisting of transition metals, and/or an electrically-conducting powder is desirably included in the carbon layer. Hereinafter, a method of forming the carbon layer including the metallic atom and/or electrically-conducting powder is explained.

To form the carbon layer including the metallic atom, a metallic-atom precursor is also mixed while mixing the nanometer-size silicon agglomerated particles and the resinous solution one another, and then the carbonizing step is carried out after removing the solvent. As for the metallic-atom precursor, a precursor having high affinity to the resin in the resinous solution, or a precursor dissolving in the resinous solution is preferable. Using an organometallic complex, such as copper phthalocyanine, is desirable. An organic substance is carbonized at the time of heating in the carbonizing step, and thereby metallic atoms are dispersed within the carbon layer to exist therein.

Moreover, to form the carbon layer including the electrically-conducting powder, the electrically-conducting powder is also mixed while mixing the nanometer-size silicon agglomerated particles and the resinous solution one another, and then the carbonizing step is carried out after removing the solvent. When the resin is carbonized at the carbonizing step, the electrically-conducting powder is dispersed within the carbon layer to exist therein.

Production Process (4) for Composite

To form a fibrous substance, which exhibits a graphite-resembling carbon skeleton and 90% by mass or more of which comprises carbon, between the respective particles of the composite, the fibrous substance is formable in the carbonizing step carried out after mixing the nanometer-size silicon agglomerated particles and the resinous solution one another and then removing the solvent. In the carbonizing step, carbon adheres onto surfaces of the agglomerated particles, and then carbon fibrous substances grow from a surface of the adhered carbon toward other agglomerated particles, and thereby the fibrous substances intervene between the respective particles of the composite.

When an obtained negative-electrode active material has been pulverized, the fibrous substances are cut off so that the function has been lost. Therefore, the following are desirable: carrying out the carbonizing step using the nanometer-size agglomerated particles having been pulverized to a desirable size in advance; and not carrying out any pulverizing operation after the carbonizing step. Since pulverizing the nanometer-size agglomerated particles in advance leads to exposing the surface of the carbon layer greatly, the fibrous substances forming conductive paths become likely to intervene between the agglomerated particles.

Moreover, as for the resin serving as a carbon source, a phenolic resin is preferable especially. Any of resole-type phenolic resins and novolac-type phenolic resins is usable.

Negative Electrode of Electric Storage Apparatus

The following steps enable the negative electrode of a nonaqueous-system secondary battery, for instance, to be fabricated using the negative-electrode active material according to the present invention: adding a proper amount of an organic solvent to a powder of the negative-electrode active material, a conductive additive like a carbon powder and a binder to mix the components one another to turn the components into a slurry; coating the slurry onto a current collector by such a method as a roll-coating method, a dip-coating method, a doctor-blade method, a spray-coating method or a curtain-coating method; and then drying or curing the binder.

Note that, for the powder of the negative-electrode active material included in the slurry, using a powder having been classified to have a particle diameter falling in a range of from 2 μm to 20 μm is preferable. When a powder of which the particle diameter is less than 2 μm is included, the contact interface between the powder and an electrolytic solution increases, so that such a case arises probably as decomposed products of the electrolytic solution augment at the time of employing the powder as a constituent element of a secondary battery. Moreover, particles of which the particle diameter is more than 20 μm have augmented stresses in the outermost shell, and thereby such a case arises probably as a negative-electrode active-material layer has broken down or come off. Moreover, since the thickness of the negative-electrode active-material layer is dependent on the particle diameters of the negative-electrode active material, such a case arises probably as controlling the thickness becomes difficult. For the classification method, publicly-known methods are usable.

The binder is required to bind the active material, and so on, together in an amount as less as possible. However, a desirable addition amount of the binder is from 0.5% by weight to 50% by weight to a summed amount of the active material, conductive additive and binder. When the binder is less than 0.5% by weight, the formability of an electrode declines; whereas the energy density of an electrode becomes low when the addition amount exceeds 50% by weight.

For the binder, the following are exemplified: polyvinylidene fluoride (e.g., polyvinylidene difluoride (or PVdF)), polytetrafluoroethylene (or PTFE), styrene-butadiene rubber (or SBR), polyimide (or PI), polyamide-imide (or PAI), carboxymethyl cellulose (or CMC), polyvinylchloride (or PVC), methacrylic resins (or PMA), polyacrylonitrile (or PAN), modified polyphenylene oxide (or PPO), polyethylene oxide (or PEO), polyethylene (or PE), polypropylene (or PP), polyacrylic acids (or PAA), and the like.

Using polyvinylidene fluoride as a binder enables the potential of a negative electrode to lower so that upgrading the voltage of an electric storage apparatus becomes feasible. Moreover, using polyamide-imide (or PAI) or a polyacrylic acid (or PAA) as a binder upgrades an initial efficiency, and discharged capacities.

A "current collector" means a chemically inactive high electron conductor for keeping an electric current flowing to electrodes during discharging or charging operations. Although a configuration, such as a foil or a plate, is adoptable for the current collector, the configuration is not at all limited especially as far as the configuration conforms to objectives. As the current collector, copper foils, and aluminum foils are usable suitably, for instance.

As the negative-electrode active material, the following publicly-known active materials, for instance, are also mixable with the negative-electrode active material according to the present invention: graphite, hard carbon, silicon, carbon fibers, tin (Sn), silicon oxide, and the like. Among the publicly-known active materials, a silicon oxide expressed by $SiO_x$ (where $0.3 \leq "x" \leq 1.6$) is preferable especially. Each of particles in a powder of the silicon oxide is composed of $SiO_x$ having been decomposed into fine Si, and $SiO_2$ covering the Si by a disproportionation reaction. When the "x" is less than the lower-limit value, volumetric changes become too large at the time of charging and discharging operations because the Si ratio becomes so high, and thereby cyclability declines. Moreover, when the "x" exceeds the upper-limit value, the Si ratio declines so that energy density comes to decline. A preferable range is $0.5 \leq "x" \leq 1.5$, and a more desirable range is $0.7 \leq "x" \leq 1.2$.

In general, when being put under such a condition that oxygen is cut off, almost all of SiO has been said to be disproportionated to separate into two phases at 1,000° C. or more. To be concrete, a silicon-oxide powder, which includes two phases, namely, a noncrystalline $SiO_2$ phase and a crystalline Si phase, is obtainable by carrying out to a raw-material silicon-oxide powder including a noncrystalline SiO powder a heat treatment at from 1,000 to 1,200° C. for from 1 to 5 hours in an inert atmosphere, such as in a vacuum or in an inert gas.

Moreover, as the silicon oxide, a composite is usable, composite in which a carbon material is composited with the $SiO_x$ in an amount of from 1 to 50% by mass. Compositing a carbon material upgrades cyclability. When a composited amount of the carbon material is less than 1% by mass, the advantageous effect of upgrading electrically-conducting property is not obtainable; whereas, when the composited amount exceeds 50% by mass, a proportion of the $SiO_x$ decreases relatively so that the capacity of a negative electrode has declined. A preferable composited amount of the carbon material falls in a range of from 5 to 30% by mass to the $SiO_x$, and a more desirable composite amount falls in a range of from 5 to 20% by mass thereto. A CVD method, or the like, is utilizable to composite the carbon material with the $SiO_x$.

A desirable silicon-oxide powder has an average particle diameter falling in a range of from 1 μm to 10 μm. When the average particle diameter is larger than 10 μm, the durability of a nonaqueous-system secondary battery declines; whereas, when the average particle diameter is smaller than 1 μm, such a case arises probably that the durability of a nonaqueous-system secondary battery declines similarly because the powder agglomerates to make coarse particles.

The conductive additive is added in order to enhance the electrically-conducting property of an electrode. As the conductive additive, the following are addable independently, or two or more of the following are combinable to add: carbonaceous fine particles, such as carbon black, graphite, acetylene black (or AB) and KETJENBLACK (or KB (registered trademark)); and gas-phase-method carbon fibers (or vapor-grown carbon fibers (or VGCF)). Although an employment amount of the conductive additive is not at all restrictive especially, setting the employment amount is possible at from 20 to 100 parts by mass approximately with respect to 100-part-by-mass active materials, for instance. When an amount of the conductive additive is less than 20% by mass, conductive passes with good efficiency are not formable; whereas, when the amount exceeds 100 parts by mass, not only the formability of an electrode worsens but also the energy density thereof becomes low. Note that, when using the silicon oxide composited with a carbon material as an active material, reducing an addition amount of the conductive additive, or making the addition amount none is possible.

To the organic solvent, any restrictions are not at all imposed especially, and even a mixture of multiple solvents does not matter at all. An especially preferable solvent is N-methyl-2-pyrrolidone, or a mixed solvent of N-methyl-2-pyrrolidone and an ester-based solvent (such as ethyl acetate, n-butyl acetate, butyl cellosolve acetate, or butyl carbitol acetate) or a glyme-based solvent (such as diglyme, triglyme, or tetraglyme).

When the electric storage apparatus according to the present invention makes a lithium-ion secondary battery, pre-doping the negative electrode with lithium is also possible. To dope the negative electrode with lithium, such an electrode chemically-forming technique is utilizable as assembling a half cell using metallic lithium for one of the counter electrodes and then doping the negative electrode with lithium electrochemically. The doping amount of lithium is not at all restricted especially.

When the electric storage apparatus according to the present invention makes a lithium-ion secondary battery, publicly-known positive electrodes, electrolytic solutions and separators are usable without any special limitations at all. An allowable positive electrode is positive electrodes being employable in nonaqueous-system secondary batteries. The positive electrode comprises a current collector, and a positive-electrode active-material layer bound together onto the current collector. The positive-electrode active-material layer includes a positive-electrode active material, and a binder, but the positive-electrode active-material layer further including a conductive additive is also permissible. The positive-electrode active material, conductive additive and binder are not at all limited especially, and accordingly are allowed to be constituent elements being employable in nonaqueous-system secondary batteries.

As for the positive-electrode active material, the following are given: metallic lithium, $LiCoO_2$, $LiNi_{1/3}Co_{1/3}Mn_{1/3}O_2$, $Li_2MnO_3$, sulfur, and the like. An allowable current collector is current collectors, such as aluminum, nickel and stainless steels, to be commonly employed for the positive electrodes of lithium-ion secondary batteries. An employable conductive additive is the same as the conductive additives set forth in the negative electrode mentioned above.

The electrolytic solution is a solution in which a lithium metallic salt, namely, an electrolyte, has been dissolved in an organic solvent. The electrolytic solution is not at all limited especially. As the organic solvent, an aprotic organic solvent is usable. For example, at least one member selected from the group consisting of the following is usable: propylene carbonate (or PC), ethylene carbonate (or EC), dimethyl carbonate (or DMC), diethyl carbonate (or DEC), ethyl methyl carbonate (or EMC), and the like. Moreover, as for the electrolyte to be dissolved, a lithium metallic salt, such as $LiPF_6$, $LiBF_4$, $LiAsF_6$, $LiI$, $LiClO_4$ or $LiCF_3SO_3$, being soluble in the organic solvent is usable.

For example, the following solution is employable: a solution comprising a lithium metallic salt, such as $LiClO_4$, $LiPF_6$, $LiBF_4$ or $LiCF_3SO_3$, dissolved in a concentration of from 0.5 mol/L to 1.7 mol/L approximately in an organic solvent, such as ethylene carbonate, dimethyl carbonate, propylene carbonate or dimethyl carbonate.

The separator is not at all limited especially as far as being separators being capable of being employed for nonaqueous-system secondary batteries. The separator is one of the constituent elements isolating the positive electrode and negative electrode from one another and retaining the electrolytic solution therein, and accordingly a thin microporous membrane, such as polypropylene or polyethylene, is usable.

When the electric storage apparatus according to the present invention makes a nonaqueous-system secondary battery, the configuration is not at all limited especially, and accordingly various configurations, such as cylindrical types, laminated types and coin types, are adoptable. Even when any one of the configurations is adopted, the separators are interposed or held between the positive electrodes and the negative electrodes to make electrode assemblies. Then, after connecting intervals from the positive-electrode current collectors and negative-electrode current collectors up to the positive-electrode terminals and negative-electrode terminals, which lead to the outside, with leads for collecting electricity, and the like, the electrode assemblies are sealed hermetically in a battery case along with the electrolytic solution, thereby turning the positive-electrode and negative-electrode assemblies into a battery.

EXAMPLES

The embodiment modes of the present invention are hereinafter explained in detail by describing examples and comparative examples thereof.

First Example

A mixed solution of 7-mL HF aqueous solution with a concentration of 46% by weight and 56-mL HCl aqueous solution with a concentration of 36% by weight was cooled to 0° C. in an ice bath, and 3.3-g calcium disilicide ($CaSi_2$) was added to the mixed solution and was then stirred therein in an argon-gas flow. After confirming that bubbling had completed, the temperature was increased up to room temperature, and then the mixture was further stirred at room temperature for 2 hours. Then, after adding 20-mL distilled water to the mixture, the mixture was further stirred for 10 minutes. On the occasion, a yellow-colored powder floated.

Figure 3:
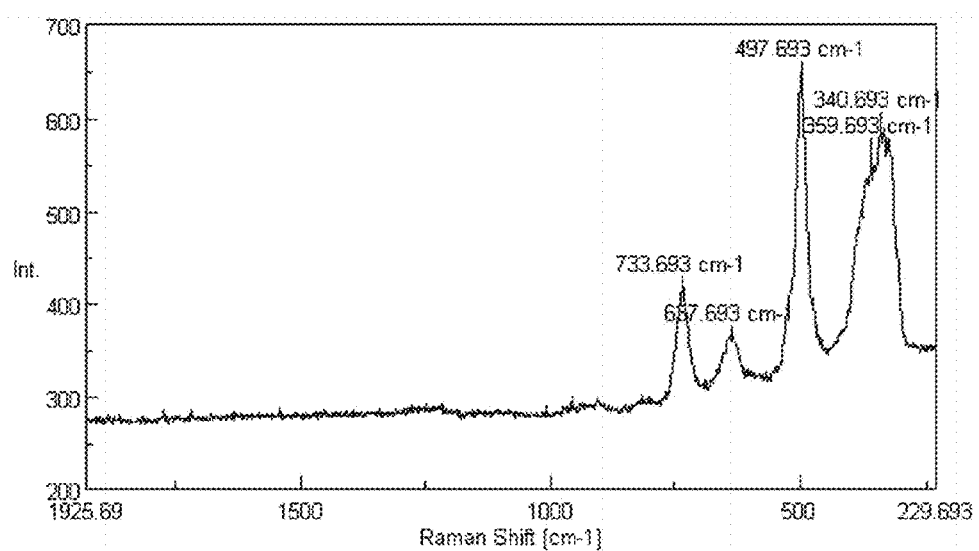
FIG. 3 is a Raman spectrum of a lamellar polysilane directed to a first example.

The thus obtained mixed solution was filtered, and a residue was then washed with 10-mL distilled water. After further washing the residue with 10-mL ethanol, the residue was vacuum dried to obtain 2.5-g lamellar polysilane. FIG. 3 shows a Raman spectrum of the lamellar polysilane. Raman-shift peaks existed at $341\pm10$ cm$^{-1}$, $360\pm10$ cm$^{-1}$, $498\pm10$ cm$^{-1}$, $638\pm10$ cm$^{-1}$, and $734\pm10$ cm$^{-1}$.

The thus synthesized lamellar polysilane was weighed out in an amount of 1 g, and underwent a heat treatment in which the weighed-out lamellar polysilane was retained at 500° C. for 1 hour within an argon gas including $O_2$ in an amount of 1% by volume or less, thereby obtaining nanometer-size silicon agglomerated particles. An X-ray diffraction measurement (or XRD measurement) using the $CuK_\alpha$ ray was carried out to the nanometer-size silicon agglomerated particles. According to the XRD measurement, halos believed to be derived from Si fine particles were observed instrumentally. The Si fine particles had a crystallite size of about 7 nm computed by the Scherrer equation from a half-value width of a diffraction peak in the (111) plane according to the result of the X-ray diffraction measurement.

Note that, in the aforementioned heat treatment, Si—H bonds are cut off so that hydrogens break away therefrom, and cutting off and recombining Si—Si bonds occur. Recombining the Si—Si bonds not only occurs within identical layers, but also occurs between respective neighboring layers. Thus, nanometer-size silicon primary particles having diameters at nanometer-size level generate. The respective nanometer-size primary particles agglomerate one another, so that nanometer-size silicon agglomerated particles (or secondary particles) generate.

FIGS. 4 and 5 show SEM photographic images of the obtained nanometer-size silicon agglomerated particles. The nanometer-size silicon agglomerated particles (or secondary particles) comprise a structure made by laminating a plate-shaped silicon body in a quantity of multiple pieces one after another in the thickness direction. Note that FIG. 5 shows a diagram in which the rectangled part shown in FIG. 4 is enlarged. Although the plate-shaped silicon bodies are observed to have a thickness of from about 10 nm to about 100 nm, a preferable thickness of the plate-shaped silicon bodies falls in a range of from 20 nm to 50 nm, from such viewpoints as the strength and the easiness of inserting lithium ions and so on thereinto and separating the ions therefrom. Moreover, the plate-shaped silicon bodies had actually a long-axis-direction length of from 0.1 µm to 50 µm, respectively. Note that preferable plate-shaped silicon bodies are believed to exhibit such an aspect ratio (i.e., "the long-axis-direction length"/"thickness") as from 2 to 1,000, respectively.

The plate-shaped silicon bodies were further observed by TEM (i.e., transmission electron microscopy)/EELS (i.e., electron energy loss spectroscopy). As shown in FIG. 6, a shaded stripe-shaped structure is noticeable in the plate-shaped silicon bodies. Note that FIG. 6 corresponds to a diagram in which the squared part shown in FIG. 5 is enlarged, and that FIG. 7 shows a schematic cross-sectional diagram illustrating a major part of the plate-shaped silicon bodies enlargedly. The light gray-colored parts shown in FIG. 6 are believed to have a structure in which flat-shaped nanometer-size silicon particles "1," namely, the primary particles, are oriented perpendicularly with respect to the long sides to arrange lamellarly; whereas the dark gray-colored parts existing between layers of the respective flat-shaped nanometer-size silicon particles "1" are believed to be voids and/or silicon oxides "2." The flat-shaped nanometer-size silicon particles "1" have a long-axis-direction length "a" of from 5 nm to 20 nm, have a short-axis-direction length "b" of from 2 to 5 nm, and have a ratio "a/b," namely, a ratio between the long axis length and the short axis length, which falls in a range of from 2.5 to 10. Moreover, a thickness of the voids and/or silicon oxides "2" is from 2 nm to 10 nm, and accordingly a ratio of the thickness of the voids and/or silicon oxides "2" with respect to the thickness of the flat-shaped nanometer-size silicon particles "1" falls in a range of from 0.5 to 2.

1 g of the nanometer-size silicon agglomerated particles was vacuum impregnated with 1.1-mL furan for 3 hours, and were then admixed with concentrated hydrochloric acid. After adding the concentrated hydrochloric acid, the nanometer-size silicon agglomerated particles were treated to polymerize the furan at 60° C. for 3 hours. Then, the nanometer-size silicon agglomerated particles were filtered and washed to remove the concentrated hydrochloric acid. The thus obtained powder was vacuum dried for 3 hours, and was thereafter calcined to carbonize polymerized-furan substances at 500° C. within an argon gas so that a gray-colored composite powder was obtained. A yield of the composite powder was 1.22 g to 1 g of the nanometer-size silicon agglomerated particles. An Si/C weight ratio, which was computed from a weight of the collected powder and the charged amount of the lamellar polysilane, was 82/18.

Figure 8:
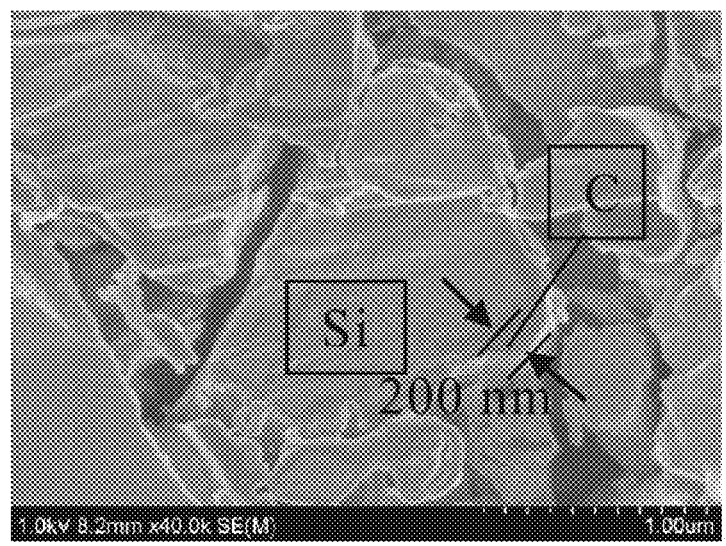
FIG. 8 is an SEM image of a gray-colored powder prepared in the first example.

FIG. 8 shows an SEM photograph of the thus obtained composite powder. From FIG. 8, a composite structure is confirmed, composite structure in which nanometer-size silicon agglomerated particles having micrometer sizes are wrapped up by a carbon layer of which the maximum thickness is about 200 nm. Moreover, specific surface areas of the composite powder and the nanometer-size silicon agglomerated particles used in producing the composite powder were measured by a BET method, respectively. Table 1 shows the results.

TABLE 1

| | BET Specific Surface Area (m²/g) |
| --- | --- |
| Nanometer-size Silicon Agglomerated Particles | 18 |
| Composite Powder | 2 |

Covering the nanometer-size silicon agglomerated particles with the carbon layer was found out to lead to making the specific surface area small.

Figure 9:
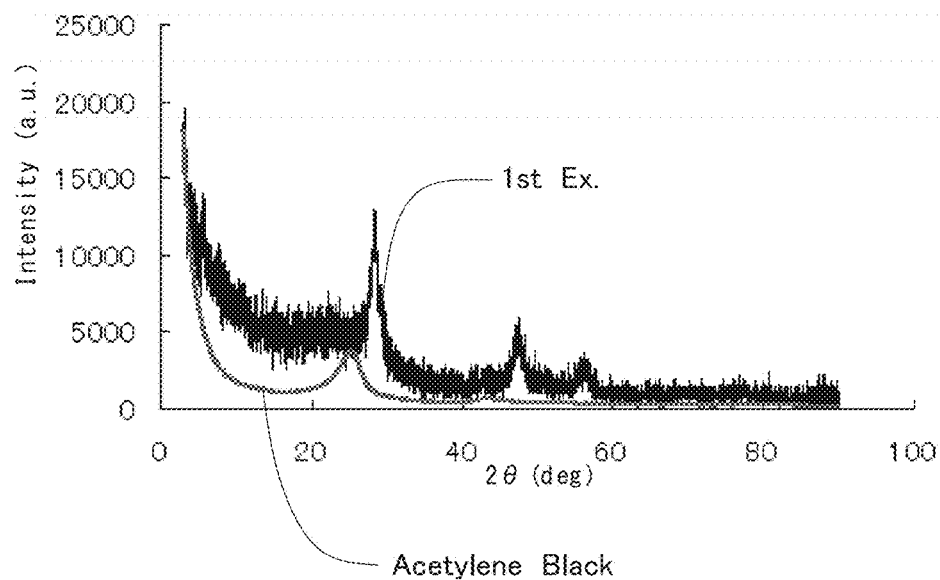
FIG. 9 is XRD spectra of acetylene black and the gray-colored powder prepared in the first example.

An X-ray diffraction measurement (or XRD measurement) using the $CuK_\alpha$ ray was carried out to the composite powder. FIG. 9 shows an XRD spectrum of the composite powder. FIG. 9 also shows another XRD spectrum of acetylene black. Since a peak (i.e., the crystalline-carbon peak), which existed at 2θ=26 deg. in the acetylene black, was not appreciated in the composite powder, carbon included in the composite powder was found out to be amorphous. Moreover, from the half-value width, a crystallite size of Si within the composite powder was also found out to be 10 nm or less.

A slurry was prepared by mixing the following one another: the thus obtained composite powder in an amount of 45 parts by mass; a powder of natural graphite in an amount of 40 parts by mass; acetylene black in an amount of 5 parts by mass; and a binder solution in an amount of 33 parts by mass. For the binder solution, a solution comprising a polyamide-imide (or PAI) resin dissolved in N-methyl-2-pyrrolidone (or NMP) in an amount of 30% by mass was used. The slurry was coated onto a surface of an electrolyzed copper foil (i.e., a current collector) having about 20 μm in thickness using a doctor blade, thereby forming a negative-electrode active-material layer on the copper foil. Thereafter, the current collector and the negative-electrode active-material layer were adhesion joined firmly by a roll pressing machine. The adhesion-joined substance was vacuum dried at 100° C. for 2 hours, thereby forming a negative electrode of which the negative-electrode active-material layer had a thickness of 16 μm.

Using as an evaluation electrode the negative electrode fabricated through the procedures mentioned above, a lithium secondary battery (i.e., a half cell) was fabricated. A metallic lithium foil with 500 μm in thickness was set as the counter electrode.

The counter electrode was cut out to ϕ13 mm, and the evaluation electrode was cut out to ϕ11 mm. Then, a separator composed of a glass filter produced by HOECHST CELANESE Corporation and "Celgard 2400" produced by CELGARD Corporation was set or held between the two to make an electrode-assembly battery. The electrode-assembly battery was accommodated in a battery case (e.g., a member for CR2032-type coin battery, a product of HOSEN Co., Ltd.). A nonaqueous electrolytic solution was injected into the battery case. Note that the nonaqueous electrolytic solution comprised a mixed solvent composed of ethylene carbonate and diethyl carbonate mixed one another in a ratio of 1:1 by volume, and $LiPF_6$ dissolved in the mixed solvent in a concentration of 1 M. Then, the battery case was sealed hermetically to obtain a lithium secondary battery.

First Comparative Example

Other than using, instead of the composite powder, the nanometer-size silicon agglomerated particles prepared in the first example (which had not undergone the furan addition and the polymerization), a negative electrode was fabricated in the same manner as the first example, and then a lithium secondary battery was likewise obtained.

Battery Characteristic Test 1

The lithium secondary batteries according to the first example and the first comparative example were measured for the initial charged capacities upon being charged under such conditions that the temperature was set at 25° C. and the electric current was set at 0.2 mA. Table 2 shows the results. Moreover, the discharged capacities were measured upon being discharged under such a condition that the electric current was set at 0.2 mA, and then the initial efficiencies (i.e., (Charged Capacities)/(Discharged Capacities)) were computed. Table 2 shows the results.

Figure 10:
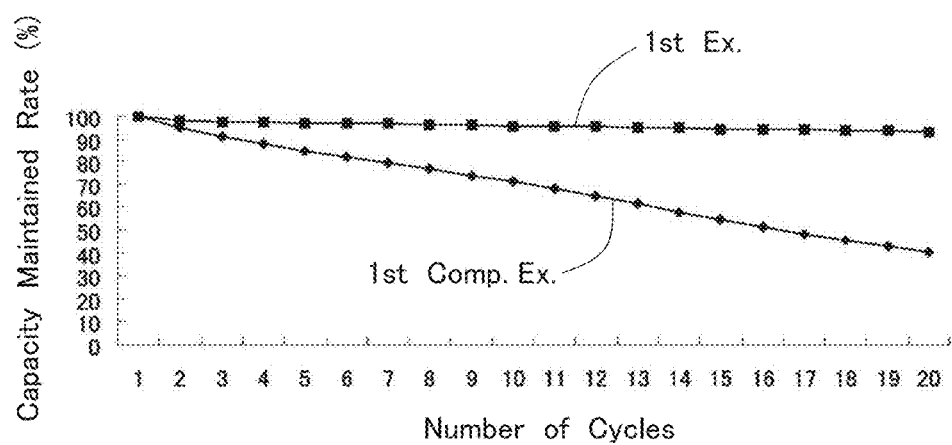
FIG. 10 is a graph showing relationships of the capacity maintained rates, which lithium-ion secondary batteries directed to the first example and a first comparative example exhibited, with respect to the number of cycles.

Using the lithium secondary batteries according to the first example and the first comparative example, a cycle test was carried out. In the cycle test, a cycle composed of steps described below was repeated 20 cycles: the batteries were charged up to 1 V under such conditions that the temperature was set at 25° C. and the electric current was set at 0.2 mA; the batteries took a pause for 10 minutes; the batteries were then discharged down to 0.01 V under such a condition that the electric current was set at 0.2 mA; and the batteries took another pause for another 10 minutes. And, capacity maintained rates, namely, proportions of the "N"th-cycle charged capacities to the 1st-cycle charged capacities, were measured. FIG. 10 illustrates the results. Moreover, Table 2 shows the 20th-cycle charged capacities and capacity maintained rates.

TABLE 2

|  | Initial Charged Capacity (mAh/g) | Initial Efficiency (%) | 20th-cycle Charged Capacity (mAh/g) | 20th-cycle Capacity Maintained Rate (%) |
|---|---|---|---|---|
| 1st Ex. | 950 | 73.2 | 884 | 93 |
| 1st Comp. Ex. | 1290 | 72.8 | 496 | 40 |

From FIG. 10 and Table 2, making a negative-electrode active material of the composite powder, which comprised the nanometer-size silicon agglomerated particles covered with the carbon layer including amorphous carbon, was found out to lead not only to upgrading the initial efficiency, but also to improving the cyclability considerably.

Second Example 1 g of the nanometer-size silicon agglomerated particles prepared in the first example was vacuum impregnated with 1-mL pyrrole for 3 hours, and were then admixed with concentrated hydrochloric acid. After adding the concentrated hydrochloric acid, the nanometer-size silicon agglomerated particles were treated to polymerize the pyrrole at 60° C. for 3 hours. Then, the nanometer-size silicon agglomerated particles were filtered and washed to remove the concentrated hydrochloric acid. The thus obtained powder was vacuum dried for 3 hours, and was thereafter calcined to carbonize polymerized-pyrrole substances at 500° C. within an argon gas so that a gray-colored composite powder was obtained. A yield of the composite powder was 1.29 g to 1 g of the nanometer-size silicon agglomerated particles. Moreover, an Si/C weight ratio, which was computed from a weight of the collected powder and the charged amount of the lamellar polysilane, was 75/25.

Other than using the composite powder, a negative electrode was fabricated in the same manner as the first example, and then a lithium secondary battery was likewise obtained.

Third Example 1 g of the nanometer-size silicon agglomerated particles prepared in the first example was vacuum impregnated with 1-mL pyrrole for 3 hours, and were then admixed with a solution comprising 10-mg iron(III) chloride (or ferric chloride) dissolved in 10-mL dichloromethane. The admixture was treated to polymerize the pyrrole at 60° C. for 3 hours. Then, the nanometer-size silicon agglomerated particles were filtered, and washed with ethanol. The thus obtained powder was vacuum dried for 3 hours, and was thereafter calcined to carbonize polymerized-pyrrole substances at 500° C. within an argon gas so that a gray-colored composite powder was obtained. A yield of the composite powder was 1.35 g to 1 g of the nanometer-size silicon agglomerated particles. Moreover, an Si/C weight ratio, which was computed from a weight of the collected powder and the charged amount of the lamellar polysilane, was 78/22.

Other than using the composite powder, a negative electrode was fabricated in the same manner as the first example, and then a lithium secondary battery was likewise obtained.

Battery Characteristic Test 2

Using the lithium-ion secondary batteries according to the first through third examples and the first comparative example, the initial charged capacities and initial efficiencies were measured in the same manner as Battery Characteristic Test 1. Moreover, the same cycle test as described in Battery Characteristic Test 1 was carried out, thereby measuring the 10th-cycle capacity maintained rates. Table 3 shows the results.

TABLE 3

|  | Carbon-layer Source | Polymerizing Catalyst | Initial Efficiency (%) | Initial Charged Capacity (mAh/g) | Capacity Maintained Rate (%) |
|---|---|---|---|---|---|
| 1st Ex. | Furan | Conc. Hydrochloric Acid | 73.2 | 908 | 95.7 |
| 2nd Ex. | Pyrrole | Conc. Hydrochloric Acid | 71.5 | 889 | 97.4 |
| 3rd Ex. | Pyrrole | Iron (III) Chloride | 81.8 | 908 | 92.7 |
| 1st Comp. Ex. | — | — | 72.8 | 1033 | 71.0 |

Using pyrrole, instead of furan, was found out to lead to further upgrading the cyclability. And, using iron(III) chloride (or ferric chloride), instead of concentrated hydrochloric acid, as the polymerizing catalyst and then polymerizing pyrrole in a nonaqueous atmosphere were also found out to result in upgrading the initial efficiency.

Fourth Example

The composite powder obtained in the first example was pulverized with a ball mill so as to have a 10-μm average particle diameter. After adding 100 g of zirconia balls with ϕ4 mm to 1 g of the composite powder, the pulverization was carried out at a rate of 70 rpm for 2 hours. Then, a slurry was prepared by mixing the following one another: the post-pulverization composite powder in an amount of 85 parts by mass; acetylene black in an amount of 5 parts by mass; and a binder solution in an amount of 33 parts by mass. For the binder solution, a solution comprising a polyamide-imide (or PAI) resin dissolved in N-methyl-2-pyrrolidone (or NMP) in an amount of 30% by mass was used. The slurry was coated onto a surface of an electrolyzed copper foil (i.e., a current collector) having about 20 μm in thickness using a doctor blade, thereby forming a negative-electrode active-material layer on the copper foil. Thereafter, the current collector and the negative-electrode active-material layer were adhesion joined firmly by a roll pressing machine. The adhesion-joined substance was vacuum dried at 100° C. for 2 hours, thereby forming a negative electrode of which the negative-electrode active-material layer had a thickness of 16 μm.

Using the negative electrode, a lithium secondary battery was obtained in the same manner as the first example.

Fifth Example

To 1 g of the nanometer-size silicon agglomerated particles prepared in the first example, a solution, of which the solid content was 58% by mass and which comprised a resole-type phenolic resin dissolved in a mixed solvent composed of acetone and methanol, was added in an amount of 0.86 g, so as to make an Si/C charged-weight ratio=2/1, and was well stirred therewith. After removing the solvents from the mixture, the nanometer-size silicon agglomerated particles were heated to cure the phenolic resin at 120° C. under a reduced pressure for 1 hour. Subsequently, the nanometer-size silicon agglomerated particles were calcined to carbonize the phenolic resin at 900° C. within an argon gas for 20 minutes. An Si/C weight ratio, which was computed from a weight of the collected powder and the charged amount of the lamellar polysilane, was 80/20. The thus obtained black-colored powder was pulverized with a ball mill so as to have a 10-μm average particle diameter, thereby preparing a composite powder. After adding 100 g of zirconia balls with φ4 mm to 1 g of the black-colored powder, the pulverization was carried out at a rate of 70 rpm for 2 hours.

Other than using the composite powder, a negative electrode was fabricated in the same manner as the fourth example, and then a lithium secondary battery was likewise obtained.

Sixth Example

Other than adjusting the charged weight ratio so that the Si/C weight ratio, which was computed from a weight of the collected powder and the charged amount of the lamellar polysilane, became 95/5, a composite powder was prepared in the same manner as the fifth example. Moreover, other than using the composite powder, a negative electrode was fabricated in the same manner as the fourth example, and then a lithium secondary battery was likewise obtained.

Second Comparative Example

A slurry was prepared by mixing the following one another: a powder, which was made by pulverizing the carbon-layer-free nanometer-size silicon agglomerated particles prepared in the first example in the same manner as described in the fifth example, in an amount of 85 parts by mass; acetylene black in an amount of 5 parts by mass; and a binder solution in an amount of 33 parts by mass. For the binder solution, a solution comprising a polyamide-imide (or PAI) resin dissolved in N-methyl-2-pyrrolidone (or NMP) in an amount of 30% by mass was used. The slurry was coated onto a surface of an electrolyzed copper foil (i.e., a current collector) having about 20 μm in thickness using a doctor blade, thereby forming a negative-electrode active-material layer on the copper foil. Thereafter, the current collector and the negative-electrode active-material layer were adhesion joined firmly by a roll pressing machine. The adhesion-joined substance was vacuum dried at 100° C. for 2 hours, thereby forming a negative electrode of which the negative-electrode active-material layer had a thickness of 16 μm.

Using the negative electrode, a lithium secondary battery was obtained in the same manner as the fourth example.

Battery Characteristic Test 3

Using the lithium secondary batteries according to the fourth through sixth examples and the second comparative example, the initial charged capacities and initial efficiencies were measured in the same manner as Battery Characteristic Test 1. Moreover, the same cycle test as described in Battery Characteristic Test 1 was carried out, thereby measuring the 20th-cycle charged capacities. Table 4 shows the results.

TABLE 4

| | Carbon-layer Source | Si/C Mass Ratio | Initial Efficiency (%) | Initial Charged Capacity (mAh/g) | 20-cycle Charged Capacity (mAh/g) |
|---|---|---|---|---|---|
| 4th Ex. | Fur an | 82/18 | 73.2 | 950 | 884 |
| 5th Ex. | Phenolic Resin | 80/20 | 77.2 | 1220 | 1147 |
| 6th Ex. | Phenolic Resin | 95/5 | 75.0 | 1270 | 953 |
| 2nd Comp. Ex. | — | 100/0 | 71.0 | 1590 | 710 |

The lithium secondary batteries directed to the fifth and sixth examples were found out to be high in both of the initial charged capacity and initial efficiency compared with the fourth example, and were found to excel in the cyclability. Moreover, even when the carbon proportion within the composite composition was 5% by mass, the advantageous effects were clearly expressed sufficiently.

Seventh Example

To 1 g of a powder of the nanometer-size silicon agglomerated particles prepared in the first example, polycarbonate was added so that the charged weight ratio became Si/C=2/1. On the occasion, the polycarbonate was added to the powder as a solution in which the polycarbonate had been dissolved in NMP so as to make a 20%-by-mass solid content, and was well stirred therewith. After removing the solvent from the mixture, the powder was heated at 120° C. under a reduced pressure for 1 hour. Subsequently, the powder was calcined to carbonize the polycarbonate at 90° C. within an argon gas for 20 minutes. An Si/C weight ratio, which was computed from a weight of the collected powder and the charged amount of the lamellar polysilane, was 80/20. The thus obtained black-colored powder was pulverized so as to have a 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Eighth Example

To 1 g of the nanometer-size silicon agglomerated particles prepared in the first example, an epoxy resin was added so that the charged weight ratio became Si/C=2/1. As for the epoxy resin, a bisphenol type-A liquid epoxy resin (e.g., "jER828" produced by MITSUBISHI CHEMICAL Corporation) was used. Moreover, the epoxy resin was added to the nanometer-size silicon agglomerated particles as a solution in which the epoxy resin had been dissolved in NMP so as to make a 50%-by-mass solid content, and was well stirred therewith. After removing the solvent from the mixture, the nanometer-size silicon agglomerated particles were heated at 120° C. under a reduced pressure for 1 hour. Subsequently, the nanometer-size agglomerated particles were calcined to carbonize the epoxy resin at 900° C. within an argon gas for 20 minutes. An Si/C weight ratio, which was computed from a weight of the collected powder and the charged amount of the lamellar polysilane, was 80/20. The thus obtained black-colored powder was pulverized so as to have a 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Battery Characteristic Test 4

Using the lithium secondary batteries directed to the fifth, seventh and eighth examples, the initial charged capacities and initial efficiencies were measured in the same manner as Battery Characteristic Test 1. Table 5 shows the results.

TABLE 5

|  | Carbon-layer Source | Si/C Mass Ratio | Initial Efficiency (%) | Initial Charged Capacity (mAh/g) |
|---|---|---|---|---|
| 5th Ex. | Phenolic Resin | 80/20 | 77.2 | 1220 |
| 7th Ex. | Poly-carbonate | 80/20 | 62.1 | 807 |
| 8th Ex. | Epoxy Resin | 80/20 | 60.5 | 787 |

From Table 4 and Table 5, even when the polycarbonate and epoxy resin were set as a carbon-layer source, the negative-electrode active materials functioning as a constituent element of the secondary batteries were obtained, even though the negative-electrode active materials did not function so equally as the fifth example. And, using the phenolic resin was found out to lead to clearly expressing the advantageous effect maximally.

Ninth Example

To 1 g of the nanometer-size silicon agglomerated particles prepared in the first example, a solution, of which the solid content was 58% by mass and which comprised a resole-type phenolic resin dissolved in a mixed solvent composed of acetone and methanol, was added in an amount of 0.43 g, so as to make an Si/C charged-weight ratio=3/1, and was well stirred therewith. After removing the solvents from the mixture, the nanometer-size silicon agglomerated particles were heated at 120° C. under a reduced pressure for 1 hour. Subsequently, the nanometer-size silicon agglomerated particles were calcined to carbonize the phenolic resin at 900° C. within an argon gas for 20 minutes. An Si/C weight ratio, which was computed from a weight of the collected powder and the charged amount of the lamellar polysilane, was 86/14. The thus obtained black-colored powder was pulverized so as to have a 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Tenth Example

To 1 g of the nanometer-size silicon agglomerated particles prepared in the first example, a solution, of which the solid content was 58% by mass and which comprised a resole-type phenolic resin dissolved in a mixed solvent composed of acetone and methanol, was added in an amount of 1.15 g, so as to make an Si/C charged-weight ratio=6/4, and was well stirred therewith. After removing the solvents from the mixture, the nanometer-size silicon agglomerated particles were heated at 120° C. under a reduced pressure for 1 hour. Subsequently, the nanometer-size silicon agglomerated particles were calcined to carbonize the phenolic resin at 900° C. within an argon gas for 20 minutes. An Si/C weight ratio, which was computed from a weight of the collected powder and the charged amount of the lamellar polysilane, was 75/25. The thus obtained black-colored powder was pulverized so as to have a 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Eleventh Example

To 1 g of the nanometer-size silicon agglomerated particles prepared in the first example, a solution, of which the solid content was 58% by mass and which comprised a resole-type phenolic resin dissolved in a solvent composed of acetone and methanol mixed one another in an equal amount to each other, was added in an amount of 1.72 g, so as to make an Si/C charged-weight ratio=1/1, and was well stirred therewith. After removing the solvents from the mixture, the nanometer-size silicon agglomerated particles were heated at 120° C. under a reduced pressure for 1 hour. Subsequently, the nanometer-size silicon agglomerated particles were calcined to carbonize the phenolic resin at 900° C. within an argon gas for 20 minutes. An Si/C weight ratio, which was computed from a weight of the collected powder and the charged amount of the lamellar polysilane, was 67/33. The thus obtained black-colored powder was pulverized so as to have a 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Third Comparative Example

After removing a solvent from a solution, of which the solid content was 58% by mass and which comprised a resole-type phenolic resin dissolved in the solvent composed of acetone and methanol mixed one another in an equal amount to each other, the residual was heated at 120° C. under a reduced pressure for 1 hour. Subsequently, the residual was calcined to carbonize the phenolic resin at 900° C. within an argon gas for 20 minutes. Other than using the thus obtained carbon powder as a negative-electrode active-material powder, a negative electrode was fabricated in the same manner as the fourth example, and then a lithium secondary battery was likewise obtained.

Battery Characteristic Test 5

Figure 11:
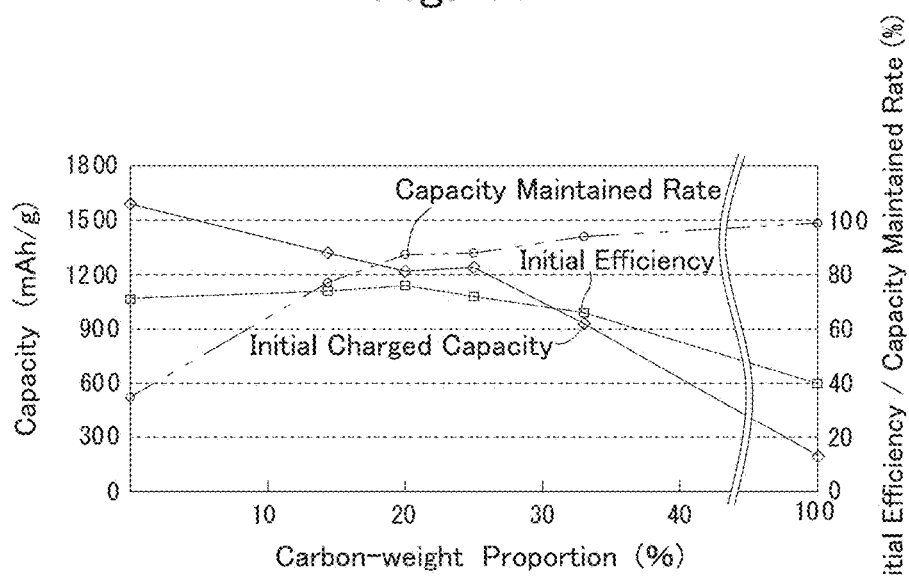
FIG. 11 is a graph showing relationships between Si/C ratios and battery characteristics.

Using the lithium-ion secondary batteries directed to the fifth and ninth through eleventh examples and the second and third comparative examples, the initial charged capacities were measured upon being charged under such conditions that the temperature was set at 25° C. and the electric current was set at 0.2 mA. Moreover, the discharged capacities were measured upon being discharged under such a condition that the electric current was set at 0.2 mA. Then, the initial efficiencies (i.e., (Charged Capacities)/(Discharged Capacities)) were computed. Table 6 and FIG. 11 show the results along with the initial charged capacities.

In addition, using the lithium-ion secondary batteries according to the fifth and eighth through tenth examples and the second and third comparative example, a cycle test was carried out. In the cycle test, a cycle composed of steps described below was repeated 20 cycles: the batteries were charged up to 1 V under such conditions that the temperature was set at 25° C. and the electric current was set at 0.2 mA; the batteries took a pause for 10 minutes; the batteries were then discharged down to 0.01 V under such a condition that the electric current was set at 0.2 mA; and the batteries took another pause for another 10 minutes. And, capacity maintained rates, namely, proportions of the 20th-cycle charged capacities to the 1st-cycle charged capacities, were measured. Table 6 and FIG. 11 show the results.

TABLE 6

|  | Si/C Weight Ratio in Composite Powder | Initial Efficiency (%) | Initial Charged Capacity (mAh/g) | Capacity Maintained Rate (%) |
|---|---|---|---|---|
| 5th Ex. | 80/20 | 77.2 | 1220 | 94 |
| 9th Ex. | 86/14 | 74.3 | 1320 | 80 |
| 10th Ex. | 75/25 | 72.1 | 1230 | 96 |
| 11th Ex. | 67/33 | 66.4 | 930 | 97 |
| 2nd Comp. Ex. | 100/0 | 71.3 | 1590 | 45 |
| 3rd Comp. Ex. | 0/100 | 40.0 | 200 | 99 |

From Table 6 and FIG. 11, in the lithium-ion secondary battery directed to the second comparative example, since no carbon was composited with the agglomerated particles comprising nanometer-size silicon, "SEI" was believed to have generated in a great amount during the cycle test, so that the capacity maintained rate was low. Moreover, like the lithium-ion secondary battery directed to the third comparative example, even when nothing but carbon derived from the phenolic resin was set as a negative-electrode active material, both the initial charged capacity and initial efficiency were too low to be said to be practical, even though the negative-electrode active material functioned as a constituent element of the secondary battery.

On the other hand, the lithium-ion secondary batteries directed to the respective examples expressed clearly high battery characteristics.

Twelfth Example

Except for setting the calcination temperature at 500° C. in the carbonizing step, a composite powder was prepared in the same manner as the fifth example. Other than using the composite powder, a negative electrode was fabricated in the same manner as the fourth example, and then a lithium-ion secondary battery was likewise obtained.

Thirteenth Example

Except for setting the calcination temperature at 1,100° C. in the carbonizing step, a composite powder was prepared in the same manner as the fifth example. Other than using the composite powder, a negative electrode was fabricated in the same manner as the fourth example, and then a lithium-ion secondary battery was likewise obtained.

Battery Characteristic Test 6

Raman spectra of the carbon layers in the composite power obtained in the fifth, twelfth and thirteenth examples were measured, and then G/D ratios between the "G"-bands and the "D"-bands were computed from the Raman spectra, respectively. Table 7 shows the results. Note that samples for measuring the Raman spectra were carbonized samples obtained by heat treating only the phenolic resin used in the respective examples in the same manner as described in the respective examples.

Using the lithium-ion secondary batteries directed to the fifth, twelfth and thirteenth examples, the initial charged capacities and initial efficiencies were measured in the same manner as Battery Characteristic Test 1. Table 7 shows the results.

TABLE 7

|  | Calcination Temperature | G/D Ratio | Initial Efficiency (%) | Initial Charged Capacity (mAh/g) |
|---|---|---|---|---|
| 5th Ex. | 900° C. | 0.236 | 77.2 | 1220 |
| 12th Ex. | 500° C. | 0.205 | 66.0 | 930 |
| 13th Ex. | 1100° C. | 0.256 | 44.8 | 200 |

The twelfth and thirteenth examples were declined in both of the initial capacity and initial efficiency, respectively, compared with the fifth example. The following were believed to be the causes: the twelfth example had a large number of defects so that the purity of amorphous carbon was low, because the twelfth example exhibited the small G/D ratio. Moreover, even though the thirteenth example exhibited the high G/D ratio, the high temperature was believed to have caused side reactions to generate SiC, so that the thirteenth example was declined remarkably in the initial capacity. Therefore, a preferable calcination temperature in the carbonizing step exceeds 500° C. but less than 1,100° C., and a preferable G/D ratio is 0.21 or more.

Battery Characteristic Test 7

Figure 12:
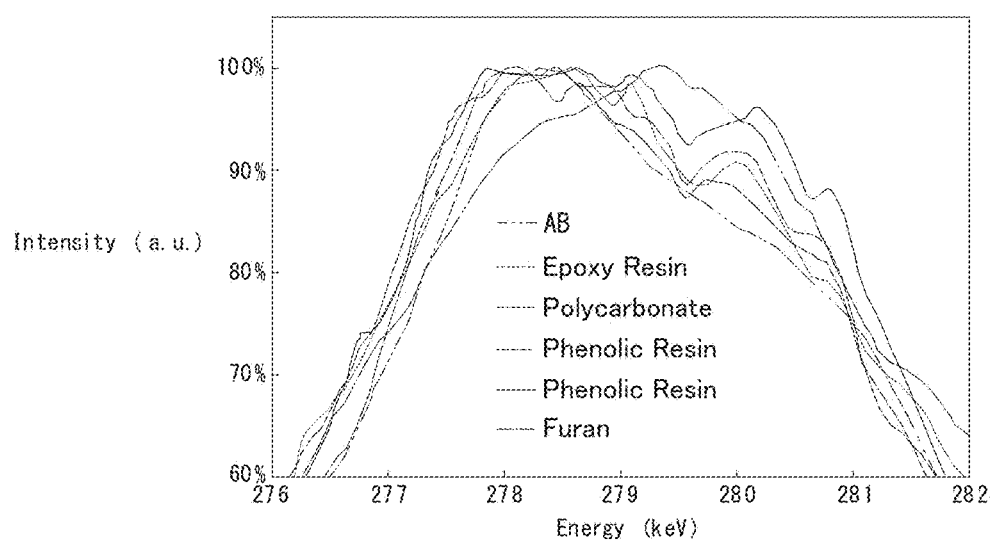
FIG. 12 is $CK_\alpha$ spectra of carbons formed from the respective carbon sources.

FIG. 12 shows $CK_\alpha$ X-ray emission spectra occurred when the negative-electrode active materials obtained in the fifth, seventh, eighth and twelfth examples were irradiated with an electron beam. Note that FIG. 12 also shows $CK_\alpha$ X-ray emission spectra occurred when acetylene black and the composite powder prepared in the first example were irradiated with the electron beam.

Conditions of the electron-beam irradiation were as described below.

Acceleration Voltage: 2 kV; Area Irradiated with the Electron Beam: 3 μm; and Electric Current for Irradiation: 80 nA From the $CK_\alpha$ spectra, peaks "A" at around hv=from 277.5 to 279.5 eV (where "h" is Planck's constant, and "v" is a frequency) were found out to be peaks specific to acetylene black, and were believed to be derived from the $sp^2$ orbital of carbon. A ratio of the height of peaks "B" at around hv=from 279.5 to 281.0 eV to the height of the peaks "A" (i.e., (Peaks "B")/(Peaks "A")) was computed. Table 8 shows the results in the column labeled "B/A".

Using the lithium-ion secondary batteries directed to the fifth, seventh, eighth and twelfth examples, the initial charged capacities and initial efficiencies were measured in the same manner as Battery Characteristic Test 1. Table 8 shows the results.

TABLE 8

|  | Carbon-layer Source | B/A | Initial Efficiency (%) | Initial Charged Capacity (mAh/g) |
|---|---|---|---|---|
| 5th Ex. | Phenolic Resin | 0.964 | 77.2 | 1220 |
| 7th Ex. | Polycarbonate | 0.915 | 60.5 | 787 |
| 8th Ex. | Epoxy Resin | 0.897 | 62.1 | 807 |
| 12th Ex. | Phenolic Resin | 0.923 | 66.0 | 930 |

The fifth example excelled in the battery characteristics especially, and the twelfth example came next to the fifth example. The seventh and eighth examples had the low battery characteristics, compared with the fifth and twelfth examples. The order of the characteristics correlated virtually with the magnitude of the peak ratios "B"/"A", so that using carbon of which the peak ratio "B"/"A" was much closer to 1.0 was found out to upgrade the characteristics of a lithium-ion secondary battery. The peak ratio "B"/"A" being much closer to 1.0 is said to be a feature common to the electronic state of carbon upgrading the battery characteristics. In other words, since carbonizing a resin to be used and then measuring the peak ratio "B"/"A" make the battery characteristics presumable without fabricating any battery, reducing man-hour requirements for experiments is enabled.

Fourteenth Example 1 g of the nanometer-size silicon agglomerated particles prepared in the first example, and 100 mg of copper phthalocyanine were added to 0.86 g of a solution, of which the solid content was 58% by mass and which comprised a resole-type phenolic resin dissolved in a solvent composed of acetone and methanol mixed one another in an equal amount to each other. Then, the nanometer-size silicon agglomerated particles, phthalocyanine and solution were stirred one another by a rotation/revolution-type stirring defoaming machine at a rate of 2,000 rpm for 8 minutes, and thereafter the mixture was defoamed at a rate of 2,200 rpm for 2 minutes. After coating the thus obtained dispersion liquid onto a substrate and then removing the solvent, the residue was heated at 120° C. under a reduced pressure for 1 hour, and was further calcined to carbonize the resin at 900° C. for 20 minutes, thereby obtaining a black-colored powder. The black-colored powder was pulverized so as to have an 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Fourth Comparative Example

Other than using 36-mg copper acetate instead of the copper phthalocyanine, a composite powder was fabricated in the same manner as the thirteenth example, and then a lithium secondary battery was likewise obtained.

Battery Characteristic Test 8

Using the lithium secondary batteries directed to the fifth and fourteenth examples and the fourth comparative example, the initial charged capacities were measured upon being charged under such conditions that the temperature was set at 25° C. and the electric current was set at 0.2 mA. Moreover, the discharged capacities were measured upon being discharged under such a condition that the electric current was set at 0.2 mA. Then, the initial efficiencies (i.e., (Charged Capacities)/(Discharged Capacities)) were computed. Table 9 shows the results along with the initial charged capacities. Moreover, the same cycle test as Battery Characteristic Test 1 was carried out, thereby measuring the 20th-cycle capacity maintained rates.

TABLE 9

|  | Copper Source | Initial Efficiency (%) | Initial Charged Capacity (mAh/g) | Capacity Maintained Rate (%) |
|---|---|---|---|---|
| 14th Ex. | Copper Phthalocyanine | 78.6 | 1120 | 97.3 |
| 5th Ex. | — | 77.2 | 1220 | 94.0 |
| 4th Comp. Ex. | Copper Acetate | 75.4 | 980 | 96.9 |

The lithium secondary battery according to the fourteenth example had the upgraded initial efficiency while clearly expressing an initial capacity equivalent to the initial capacity of the lithium secondary battery according to the fifth example. The equivalent initial capacity and upgraded initial efficiency were advantageous effects resulting from including copper atoms in the carbon layer of the composite particles. Meanwhile, the lithium secondary battery according to the fourth comparative example was inferior to the examples in both of the initial capacity and initial efficiency, even though the lithium secondary battery included copper atoms. The inferior initial capacity and initial efficiency were believed to result from lithium and oxygen that had been reacted one another, because oxygen atoms within the copper acetate came to be included within the composite particles. Therefore, among copper complexes, a copper complex free from oxygen has to be used as a starting raw material to have the composite particles include copper atoms. Note that the complex preferably has a structure comprising an organic substance and metallic atoms coordinating to the organic substance, because such a complex is likely to dissolve in organic solvents.

Fifteenth Example 1 g of the nanometer-size silicon agglomerated particles prepared in the first example, and 0.05 g of acetylene black were added to 0.78 g of a solution, of which the solid content was 58% by mass and which comprised a resole-type phenolic resin dissolved in a mixed solvent of acetone and methanol. Then, the nanometer-size silicon agglomerated particles, acetylene black and solution were stirred one another by a rotation/revolution-type stirring defoaming machine at a rate of 2,000 rpm for 8 minutes, and thereafter the mixture was defoamed at a rate of 2,200 rpm for 2 minutes. After coating the thus obtained dispersion liquid onto a substrate and then removing the solvent, the residue was heated at 120° C. under a reduced pressure for 1 hour, and was further calcined to carbonize the resin at 900° C. for 20 minutes, thereby obtaining a black-colored powder. The black-colored powder was pulverized so as to have a 10-μm average particle diameter in the same manner as described in the fifth example, thereby preparing a composite powder.

Other than using the thus obtained composite powder, a negative electrode was fabricated in the same manner as the fourth example, and then a lithium secondary battery was likewise obtained.

Battery Characteristic Test 9

Using the lithium secondary batteries directed to the fifteenth example and the fifth example, the initial charged capacities were measured upon being charged under such conditions that the temperature was set at 25° C. and the electric current was set at 0.2 mA, and the discharged capacities were further measured upon being discharged under such a condition that the electric current was set at 0.2 mA. Then, the initial efficiencies (i.e., (Charged Capacities)/(Discharged Capacities)) were computed. Table 10 shows the results along with the initial charged capacities. Moreover, a cycle test was carried out to the lithium secondary batteries. In the cycle test, a cycle composed of steps described below was repeated 20 cycles: the batteries were charged up to 1 V under such conditions that the temperature was set at 25° C. and the electric current was set at 0.2 mA; the batteries took a pause for 10 minutes; the batteries were then discharged down to 0.01 V under such a condition that the electric current was set at 0.2 mA; and the batteries took another pause for another 10 minutes. And, capacity maintained rates, namely, proportions of the 20th-cycle charged capacities to the 1st-cycle charged

TABLE 10

|  | Electrically-conducting Powder | Initial Efficiency (%) | Initial Charged Capacity (mAh/g) | Post-20th-cycle Capacity Maintained Rate (%) |
| --- | --- | --- | --- | --- |
| 15th Ex. | Acetylene Black | 78.3 | 1018 | 97.6 |
| 5th Ex. | — | 77.2 | 1220 | 94.0 |

The lithium secondary battery according to the fifteenth example had the upgraded initial efficiency while clearly expressing an initial capacity and capacity maintained rate equivalent to the initial capacity and capacity maintained rate of the lithium secondary battery according to the fifth example. The equivalent initial capacity and capacity maintained rate, and the upgraded initial efficiency were advantageous effects resulting from the setting that the composite particles possessed the carbon layer including acetylene black.

Sixteenth Example

The nanometer-size silicon agglomerated particles prepared in the first example were used, and were pulverized so as to have a 10-μm average particle diameter in the same manner as described in the fifth example. 1 g of the nanometer-size silicon agglomerated particles having been pulverized in advance, and 0.05 g of acetylene black were added to 0.78 g of a solution, of which the solid content was 58% by mass and which comprised a resole-type phenolic resin dissolved in a mixed solvent of acetone and methanol. Then, the nanometer-size silicon agglomerated particles, acetylene black and solution were stirred one another by a rotation/revolution-type stirring defoaming machine at a rate of 2,000 rpm for 8 minutes, and thereafter the mixture was defoamed at a rate of 2,200 rpm for 2 minutes. After coating the thus obtained dispersion liquid onto a substrate and then removing the solvent, the residue was heated at 120° C. under a reduced pressure for 1 hour, and was further calcined to carbonize the resin at 900° C. for 20 minutes, thereby preparing a composite powder.

Figure 13:
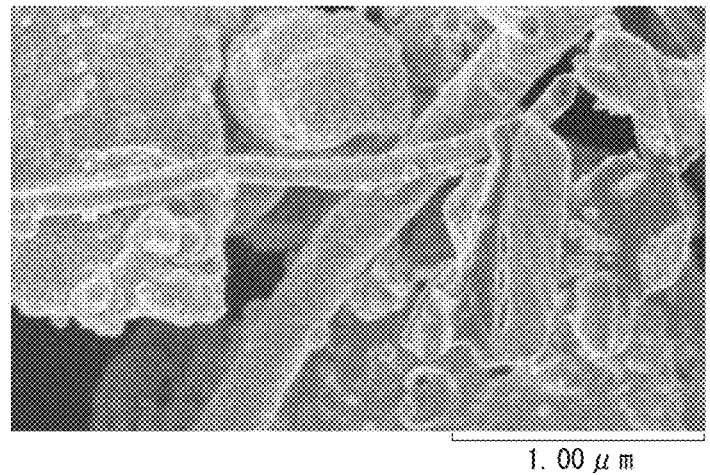
FIG. 13 is an SEM image of a cross section of composite-powder particles prepared in a sixteenth example.
Figure 14:
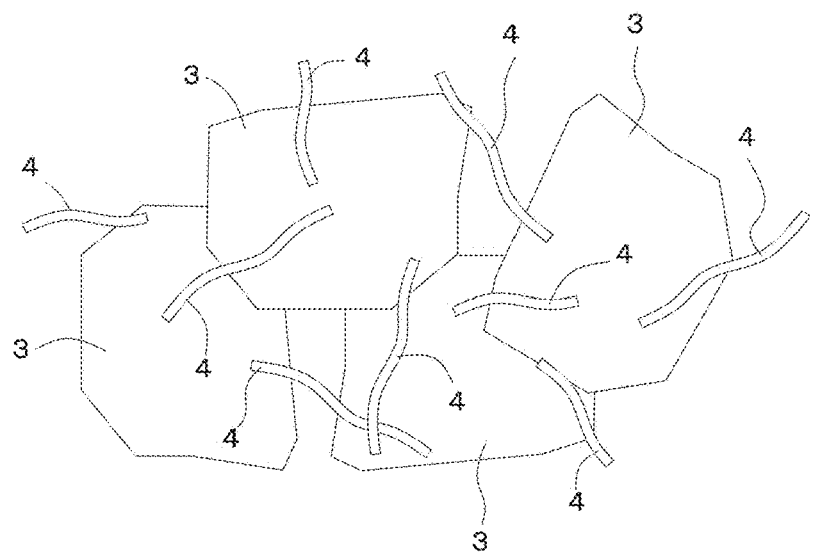
FIG. 14 is a schematic diagram of a cross section of the composite-powder particles prepared in the sixteenth example.

FIG. 13 shows an SEM image of a cross section of the composite-powder particles, and FIG. 14 illustrates a schematic diagram of the SEM image. Fibrous substances "4," of which the longitudinal-direction length was from 5 μm to a few dozen μm, intervened between the respective composite particles "3." The fibrous substances "4" had a length of from 100 nm to 500 nm in a direction (called a "width direction" hereinafter) crossing at right angles to the longitudinal direction.

Figure 15:
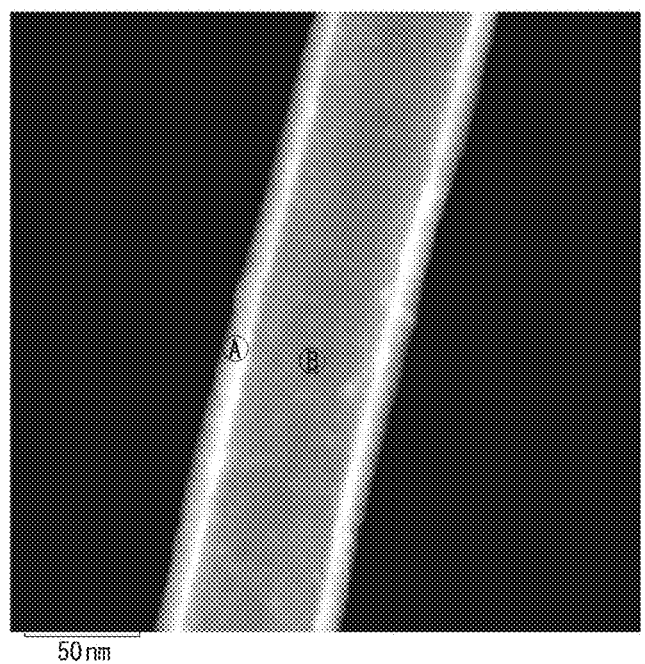
FIG. 15 is an image of a fibrous substrate included in a composite powder prepared in the sixteenth example, the image taken by a dark-field scanning-type transmission electron microscope (or ADF/STEM)
Figure 16:
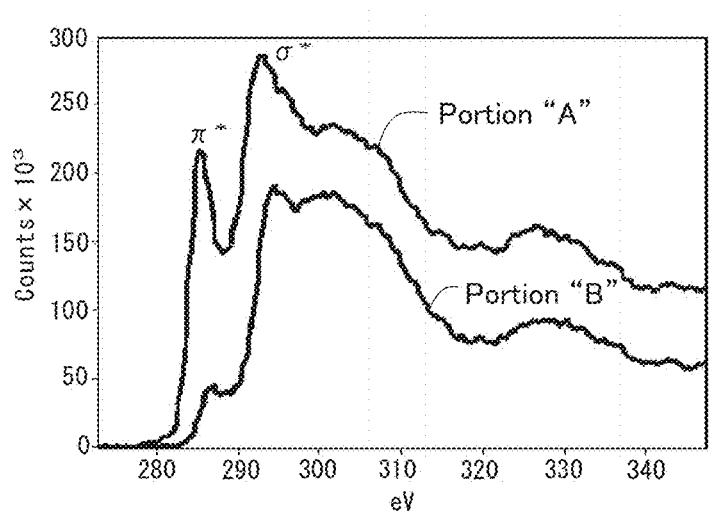
FIG. 16 is electron energy-loss spectroscopic (or EELS) spectra of the fibrous substrate included in the composite powder prepared in the sixteenth example.

FIG. 15 shows an image of the fibrous substances "4" taken with a dark-field scanning transmission electron microscope (or ADF/STEM). Since the width-direction opposite ends were bright, and since the width-direction central part was dark, the part adjacent to the surface, and the inner part was presumed to have structures that differed with each other. Hence, using an electron energy loss spectroscopy (or EELS), spectra, which resulted from an end (e.g., a portion designated "A") and a central part (e.g., another portion designated "B") when the portion "A" and "B" were irradiated with an electron beam in the perpendicular direction to the sheet face of FIG. 15, were compared with each other. As a result, the following became apparent: the π bonds were abundant in the portion "A," but were less in the portion "B," as shown in FIG. 16. From the result, the portion adjacent to the surface, and the inner portion were found out to have structures that differed with each other. Moreover, when the spectra were compared with an EELS spectrum of graphite, the following were found out: the spectrum resulting from the portion "A" corresponded to a spectrum measured in the perpendicular direction (i.e., a parallel direction with respect to the hexagonal cell planes of graphene) to the c-axis of graphite; and the spectrum resulting from the portion "B" corresponded to a spectrum measured in the parallel direction (i.e., a perpendicular direction with respect to the hexagonal cell planes of graphene) to the c-axis of graphite. From the results above, the fibrous substances "4" were judged to have an inner part formed as a hollow cylindrical shape, and to have a structure in which a graphene sheet is laminated in multilayers cylindrically.

Other than using the thus obtained composite powder, a negative electrode was fabricated in the same manner as the fourth example, and then a lithium secondary battery was likewise obtained.

Seventeenth Example

A seventeenth example was identical with the sixteenth example, except for a polyacrylic acid (or PAA) was used as a binder, instead of the polyamide-imide (or PAI), upon manufacturing a lithium secondary battery.

Battery Characteristic Test 10

Using the lithium-ion secondary batteries directed to the sixteenth and seventeenth examples and the fifth example, the initial charged capacities were measured upon being charged under such conditions that the temperature was set at 25° C. and the electric current was set at 0.2 mA, and the discharged capacities were further measured upon being discharged under such a condition that the electric current was set at 0.2 mA. Then, the initial efficiencies (i.e., (Charged Capacities)/(Discharged Capacities)) were computed. Table 11 shows the results along with the initial charged capacities. Moreover, a cycle test was carried out to the lithium secondary batteries. In the cycle test, a cycle composed of steps described below was repeated 20 cycles: the batteries were charged up to 1 V under such conditions that the temperature was set at 25° C. and the electric current was set at 0.2 mA; the batteries took a pause for 10 minutes; the batteries were then discharged down to 0.01 V under such a condition that the electric current was set at 0.2 mA; and the batteries took another pause for another 10 minutes. And, capacity maintained rates, namely, proportions of the 20th-cycle charged capacities to the 1st-cycle charged capacities, were measured. Table 11 shows the results.

TABLE 11

|  | Fibrous Substance | Binder | Initial Efficiency (%) | Initial Charged Capacity (mAh/g) | Post-20th-cycle Capacity Maintained Rate (%) |
| --- | --- | --- | --- | --- | --- |
| 16th Ex. | Present | PAI | 74.1 | 1120 | 93 |
| 17th Ex. | Present | PAA | 72.9 | 1130 | 71 |
| 5th Ex. | Cut off | PAI | 77.2 | 1220 | 94 |

Although the lithium-ion secondary battery according to the sixteenth example had identical components with the components of the fifth example, the lithium-ion secondary battery had the good battery characteristics. The good battery characteristics depended on the timings of the pulverization. That is, since the pulverization was done after the carbonizing step in the fifth example, the fibrous substances are believed to have been cut off. Moreover, since the sixteenth example had the higher capacity maintained rate than the seventeenth example, the PAI was found out to be more preferable as a binder than the PAA.

Analytical Test

The composite powder prepared in the fifth example was turned into thinly-sliced pieces by an ion milling method, and then a transmission electron microscopic (or TEM) measurement was carried out to the particles of the composite powder. FIG. 17 shows a TEM photographic image of the particles. The composite powder was found out to have a structure in which the following were laminated lamellarly: light gray-colored parts; and parts in which dark gray-colored particles (of which the major-axis particle diameter was about 10 nm) were oriented perpendicularly to the long sides to arrange lamellarly.

Hence, a TEM/EDX (i.e., energy-dispersion-type X-ray spectroscopy) analysis was carried out to the respective points labeled "Points 1 through 5" in FIG. 17 in order to ascertain compositions thereat. FIGS. 18 through 22 show the results, respectively. "Points 1 through 3" had compositions in which silicon (Si) accounted for 91.5 atomic % or more, and the dark gray-colored particles were ascertained to be nanometer-size silicon particles. Moreover, from "Points 4 and 5," a great amount of carbon (C), and a trace amount of oxygen (O) were detected in addition to Si, so that the light gray-colored parts were found out to be carbon layers in which carbon (C) was present abundantly.

That is, at the carbonizing step in the fifth example, parts corresponding to voids and/or silicon oxides "2" illustrated in FIG. 7 were believed to be impregnated with the phenolic resin, and the phenolic resin was believed to be carbonized thereafter at the parts. When all of the voids and/or silicon oxides "2" illustrated in FIG. 7 are voids, such an instance arises probably as the voids have been impregnated with an electrolytic solution to result in causing the negative-electrode active-material layer to collapse structurally when such a composite powder makes one of the constituent elements of a battery. However, as shown in Table 4, the battery according to the fifth example had the markedly-upgraded cyclability, compared with the battery according to the second comparative example. The markedly-upgraded cyclability was believed to be an advantageous effect resulting from the carbon layer formed in the voids.

Eighteenth Example

To 1 g of the nanometer-size silicon agglomerated particles prepared in the first example, a solution, of which the solid content was 58% by mass and which comprised a resole-type phenolic resin dissolved in a mixed solvent composed of acetone and methanol, was added in an amount of 0.86 g, so as to make an Si/C charged-weight ratio=2/1, and was well stirred therewith. After removing the solvents from the mixture, the nanometer-size silicon agglomerated particles were heated to cure the phenolic resin at 120° C. under a reduced pressure for 1 hour. Subsequently, the nanometer-size silicon agglomerated particles were calcined to carbonize the phenolic resin at 900° C. within an argon gas for 20 minutes. An Si/C weight ratio, which was computed from a weight of the collected powder and the charged amount of the lamellar polysilane, was 88/12. The thus obtained black-colored powder was pulverized with a ball mill so as to have a 10-μm average particle diameter, thereby preparing a composite powder. After adding 100 g of zirconia balls with ϕ4 mm to 1 g of the black-colored powder, the pulverization was carried out at a rate of 70 rpm for 2 hours.

Other than using the composite powder, a negative electrode was fabricated in the same manner as the fourth example, and then a lithium secondary battery was likewise obtained.

Nineteenth Example

Using a dry-type classifying machine, the post-pulverization composite powder in the eighteenth example was classified to make the particle diameters fall in a range of from 2 μm to 20 μm. Thus, the powder constituents of which the particle diameters were less than 2 μm, and the powder constituents of which the particle diameters exceeded 20 μm were removed. Other than using the post-classification composite powder, a negative electrode was fabricated in the same manner as the fourth example, and then a lithium secondary battery was likewise obtained.

Battery Characteristic Test 11

Using the lithium-ion secondary batteries directed to the eighteenth example and nineteenth example, the initial charged capacities were measured upon being charged up to 0.8 V under such conditions that the temperature was set at 25° C. and the electric current was set at 0.2 mA. Moreover, the discharged capacities were measured upon being discharged down to 0.01 V under such a condition that the electric current was set at 0.2 mA. Then, the initial efficiencies (i.e., (Charged Capacities)/(Discharged Capacities)) were computed. Table 12 shows the results along with the initial charged capacities.

TABLE 12

|  | Classification Treatment | Initial Efficiency (%) | Initial Charged Capacity (mAh/g) |
|---|---|---|---|
| 18th Ex. | Undone | 73.0 | 1100 |
| 19th Ex. | Done | 78.0 | 1200 |

Using the composite powder of which the particle diameters were made to fall in a range of from 2 μm to 20 μm by the classification treatment was found out to lead to upgrading the initial efficiency and initial capacity.

INDUSTRIAL APPLICABILITY

The electric storage apparatus according to the present invention is utilizable for secondary batteries, electric double-layer capacitors, lithium-ion capacitors, and the like. Moreover, the present electric storage apparatus is useful for nonaqueous-system secondary batteries utilized for driving the motors of electric automobiles and hybrid automobiles, and for personal computers, portable communication gadgets, home electric appliances, office devices, industrial instruments, and so forth. In particular, the present electric storage apparatus is usable suitably for driving the motors of electric automobiles and hybrid automobiles requiring large capacities and large outputs.

The invention claimed is:

1. A production process for negative-electrode active material, the production process comprising the following steps carried out in the following order:
   an agglomerated-particles forming step of obtaining nanometer-size silicon agglomerated particles by heat treating a lamellar polysilane having a structure in which multiple six-membered rings constituted of a silicon atom are disposed one after another, and expressed by a compositional formula, (SiH)n; and
   a carbonizing step of mixing the agglomerated particles with a resinous solution comprising a resin and a solvent, then removing the solvent, and thereafter carbonizing the resin;
   whereby forming a composite comprising the agglomerated particles, and a carbon layer including amorphous carbon and covering at least some of the agglomerated particles to be composited therewith,
   wherein said carbonizing step is carried out after mixing said agglomerated particles and an organometallic complex comprising at least one metal selected from the group consisting of transition metals with said resinous solution and then removing the solvent therefrom.

2. The production process for negative-electrode active material as set forth in claim 1, wherein said resin comprises a phenolic resin.

3. The production process for negative-electrode active material as set forth in claim 1, wherein said carbonizing step is a step of heating carried out at from 600° C. to 1,000° C.

4. The production process for negative-electrode active material as set forth in claim 1, wherein said carbonizing step is carried out after mixing said agglomerated particles and an electrically-conducting powder with said resinous solution and then removing the solvent therefrom.

* * * * *